US012774897B2

(12) United States Patent
Papantoniou et al.

(10) Patent No.: US 12,774,897 B2

(45) **Date of Patent: *Oct. 27, 2026**

(54) GEOBLOCKCHAIN AUTHENTICATION OF MAP RELATED DATA

(71) Applicant: Environmental Systems Research Institute (ESRI), Redlands, CA (US)

(72) Inventors: Konstantinos Papantoniou, Redlands, CA (US); Brent Jones, Wakefield, RI (US)

(73) Assignee: Environmental Systems Research Institute (ESRI), Redlands, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/281,392

(22) Filed: Jul. 25, 2025

(65) Prior Publication Data

US 2026/0022946 A1 Jan. 22, 2026

Related U.S. Application Data

(63) Continuation of application No. 17/685,225, filed on Mar. 2, 2022, now Pat. No. 12,399,028.

(Continued)

(51) Int. Cl.

*G06Q 20/38* (2012.01)
*G01C 21/36* (2006.01)

(Continued)

(52) U.S. Cl.

CPC ......... *G01C 21/367* (2013.01); *G06Q 20/389* (2013.01); *G06Q 30/06* (2013.01);

(Continued)

(58) Field of Classification Search

CPC .... G01C 21/367; G06Q 20/389; G06Q 30/06; G06Q 50/16; G06Q 20/4015;

(Continued)

(56) References Cited

U.S. PATENT DOCUMENTS

2014/0278708 A1* 9/2014 Byk ................. G06Q 10/06315 705/7.25
2018/0356236 A1* 12/2018 Lawrenson ........... H04L 9/3247

(Continued)

FOREIGN PATENT DOCUMENTS

CN 112084281 A * 12/2020 ............. G06F 18/23
EP 2427727 B1 * 2/2019 ......... G09B 29/1023

(Continued)

OTHER PUBLICATIONS

"Geospatial Standardization of Distributed Ledger Technologies", Open Geospatial Consortium, Available online at: http://www.opengis.net/doc/DP/dlt-blockchain-review, Oct. 9, 2018, pp. 1-20.

(Continued)

*Primary Examiner* — Chunling Ding

(74) *Attorney, Agent, or Firm* — Kilpatrick Townsend & Stockton LLP

(57) ABSTRACT

A method of providing a map with imbedded, authenticated data is described. A geographic feature is represented on a map with one or more of points, lines and polygons in a first layer of the map. Data corresponding to the geographic feature is provided. The provided data is encoded, in a first block, with the one or more of points, lines and polygons from the first layer of the map. The block is combined with other blocks of a blockchain. The blockchain is associated with the geographic feature on the map as represented by the one or more of points, lines and polygons in the first layer of the map.

20 Claims, 14 Drawing Sheets

Related U.S. Application Data

(60) Provisional application No. 63/157,552, filed on Mar. 5, 2021.

(51) Int. Cl.

| | |
|---|---|
| ***G06Q 30/06*** | (2023.01) |
| ***G06Q 50/16*** | (2012.01) |
| ***H04L 9/40*** | (2022.01) |
| *G06Q 20/40* | (2012.01) |

(52) U.S. Cl.
CPC ......... *G06Q 50/16* (2013.01); *H04L 63/0823* (2013.01); *G06Q 20/4015* (2020.05); *H04L 2209/56* (2013.01)

(58) Field of Classification Search
CPC . G06Q 20/405; H04L 2209/56; H04L 63/107; H04L 67/02; H04L 2463/121; H04L 9/50; H04L 63/0823
See application file for complete search history.

(56) References Cited

U.S. PATENT DOCUMENTS

| | | | | |
|---|---|---|---|---|
| 2019/0279247 | A1* | 9/2019 | Finken | H04L 9/0637 |
| 2020/0042012 | A1* | 2/2020 | Zander | G01C 21/36 |
| 2020/0103233 | A1* | 4/2020 | McErlean | G01C 21/3859 |
| 2020/0210979 | A1 | 7/2020 | Garg et al. | |
| 2022/0038853 | A1* | 2/2022 | Sloane | G06Q 20/389 |

FOREIGN PATENT DOCUMENTS

| | | | | | |
|---|---|---|---|---|---|
| EP | 3518207 | A2 | * | 7/2019 | G01C 21/3697 |
| KR | 20190053823 | A | * | 5/2019 | G06F 16/29 |
| WO | WO-2019081015 | A1 | * | 5/2019 | G06Q 30/0259 |
| WO | WO-2021030877 | A1 | * | 2/2021 | G06F 16/29 |

OTHER PUBLICATIONS

"OGC Announces the Creation of a New Domain Working Group for Blockchain and Distributed Ledger Technologies", Open Geospatial Consortium, Available online at: https://www.ogc.org/announcement/ogc-announces-the-creation-of-a-new-domain-working-group-for-blockchain-and-distributed-ledger-technologies/, Jul. 10, 2019, pp. 1-4.

U.S. Appl. No. 17/685,225, "Advisory Action", Oct. 9, 2024, 3 pages.

U.S. Appl. No. 17/685,225, "Final Office Action", Jul. 31, 2024, 22 pages.

U.S. Appl. No. 17/685,225, "Non-Final Office Action", Mar. 20, 2024, 17 pages.

U.S. Appl. No. 17/685,225, "Notice of Allowance", Apr. 28, 2025, 11 pages.

U.S. Appl. No. 17/685,225, "Notice of Allowance", Jan. 2, 2024, 10 pages.

* cited by examiner

Table 2: Land Ownership Roles

| Land Ownership Example | |
|---|---|
| Participants | Responsibilities |
| GeoBlockchain-Administrator | Administrator has full privileges to Hyperledger Fabric and ArcGIS Enterprise |
| GeoBlockchain-Seller | Participant that is added to GeoBlockchain with controlled roles only for "Seller" Group |
| GeoBlockchain-Legal Authority | Participant that is added to GeoBlockchain with controlled roles only for "Legal Authority" Group |
| GeoBlockchain-Land Owners | Participant that is added to GeoBlockchain with controlled roles only for "Land Owners" Group |
| GeoBlockchain-Customers | Participant that is added to GeoBlockchain with controlled roles only for "Customers" Group |
| GeoBlockchain-Stakeholders | User that is added to GeoBlockchain with controlled roles only for "Stakeholders" Group |

*FIG. 5*

| Supply Chain Example | |
|---|---|
| Participants | Responsibilities |
| GeoBlockchain-Administrator | Administrator has full privileges to Hyperledger Fabric and ArcGIS Enterprise |
| GeoBlockchain-Supplier | Participant that is added to GeoBlockchain with controlled roles only for "Supplier" Group |
| GeoBlockchain-Port | Participant that is added to GeoBlockchain with controlled roles only for "Port" Group |
| GeoBlockchain-Distribution Center | Participant that is added to GeoBlockchain with controlled roles only for "Distribution Center" Group |
| GeoBlockchain-Shipping | Participant that is added to GeoBlockchain with controlled roles only for "Ship" Group |
| GeoBlockchain-Trucking | User that is added to GeoBlockchain with controlled roles only for "Trucking" Group |

*FIG. 7*

GEOBLOCKCHAIN AUTHENTICATION OF MAP RELATED DATA

CROSS REFERENCE PARAGRAPH FOR PRIORITY

This application is a continuation application of U.S. Non-Provisional application Ser. No. 17/685,225, filed on Mar. 2, 2022, and titled, "GEOBLOCKCHAIN AUTHENTICATION OF MAP RELATED DATA" which claims the benefit and priority of U.S. Provisional Application No. 63/157,552, filed on Mar. 5, 2021, and titled "GEOBLOCKCHAIN AUTHENTICATION OF MAP RELATED DATA," which are hereby incorporated by reference in their entirety for all purposes.

BACKGROUND OF THE INVENTION

Unless otherwise indicated herein, the materials described in this section are not prior art to the claims in this application and are not admitted to be prior art by inclusion in this section. In particular, disparate technologies are discussed that it would not be obvious to discuss together absent the teachings of the present invention.

Blockchain is primarily known for cryptocurrencies, but has been proposed for a variety of other uses, such as smart contracts. Blockchain has also been proposed to be used for certain map applications. For example, blockchain has been described for storing differences between what a car sensor detects and a navigation map (see US Pub. No. 2020/0103233). It has been suggested to use geodesic grids of discrete cells to register land ownership on a blockchain. "GeoBlockchain" has been described as tracking where a transaction occurred, suggesting combining blockchain with GIS, and showing transactions on a map. However, a viable implementation needs to be provided.

ArcGIS is a Geographic Information System (GIS) for working with maps and geographic information maintained by the Environmental Systems Research Institute, Inc. (Esri). It is used for creating and using maps, compiling geographic data, analyzing spatial and non-spatial information using its location, sharing and discovering geographic information, using maps and geographic information in a range of applications, and managing geographic information in a database. The system provides an infrastructure for making maps and geographic information available throughout an organization, across a community, and openly on the Web.

Layers are the mechanism used to display geographic datasets in ArcGIS, GIS, CAD and other mapping systems. Each layer references a dataset and specifies how that dataset is portrayed using symbols and text labels. Data can come from a wide variety of sources (databases, web services, files, etc). When a layer is added to a map, its dataset is specified and its map symbols and labeling properties are set. Each map, globe, or scene document in ArcGIS is assembled by adding a series of layers. Layers are displayed in a particular order displayed in the map's table of contents. Layers listed at the bottom are displayed first, followed by the layers above them. Layers provide one of the primary ways for working with geographic data in ArcGIS.

BRIEF SUMMARY

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

According to certain embodiments, a method of providing a map with embedded, authenticated data as a GeoBlockchain is described. A geographic feature is represented on a map with one or more of points, lines and polygons in a first layer of the map. Data corresponding to the geographic feature is provided. The provided data is encoded, in a first block, with the one or more of points, lines and polygons from the first layer of the map. The block is combined with other blocks of a GeoBlockchain. The GeoBlockchain is associated with the geographic feature on the map as represented by the one or more of points, lines and polygons in the first layer of the map. The geographic feature may be, for example, a location, such as the metes and bounds of a property. Alternately, the geographic feature could be a city, country, park, or other entity whose boundaries may change over time, and thus the exact location may change. Alternately, the geographic feature could be a mountain range, lake, forest, etc. whose extent is not precisely defined. Other examples of geographic features are physical features, utilities, underground utilities, survey control monuments, property boundary monuments, address, building, apartment, condominium, and anything that can be represented on a map or in a database that has a location.

In certain embodiments the data encoded is transaction data. The transaction data is data about an event that is recorded on the GeoBlockchain. For example, the event can be a sale of property, or the location of a shipping container. The block also includes other data, such as identification of an asset (e.g., property parcel or shipping container) and a participant (e.g., purchaser, seller, supplier, shipper, etc.). The data can also be sensor data (temperature, vibration, tilt, moisture, etc.). Collecting this data with the location can show who has liability for damage or delivery date. These sensors can be bundled into IoT, Internet of Things. The transaction data is encoded along with its metadata and is encrypted. Also encoded is the geography such as points, addresses, lines, multi lines, polygons and multi polygons. The data can either be recorded as text or in a cryptographic method into the blockchain (stored in the GeoBlockchain or referenced as trusted source in the GeoBlockchain).

In further embodiments, the method includes authoritative badging which identifies the source of map data as authoritative. For example, authoritative sources may include FEMA for a flood zone map layer, a county government for a zoning map layer, a weather bureau for a climate map, and various U.S. Geological Survey maps of topography, mineral resources, etc. Each of these maps can be badged based on the GeoBlockchain ("GBC") participants verifying the government source of the map. In one embodiment, it can be badged as a spatial smart contract.

BRIEF DESCRIPTION OF THE DRAWINGS

The detailed description is set forth with reference to the accompanying figures. In the figures, the left-most digit(s) of a reference number identifies the figure (FIG.) in which the reference number first appears.

FIG. 5 is a table of GeoBlockchain participants and roles for a land ownership example, according to an embodiment.

FIG. 7 is a table of GeoBlockchain participants and roles for a supply chain example, according to an embodiment.

DETAILED DESCRIPTION

Figure 1:
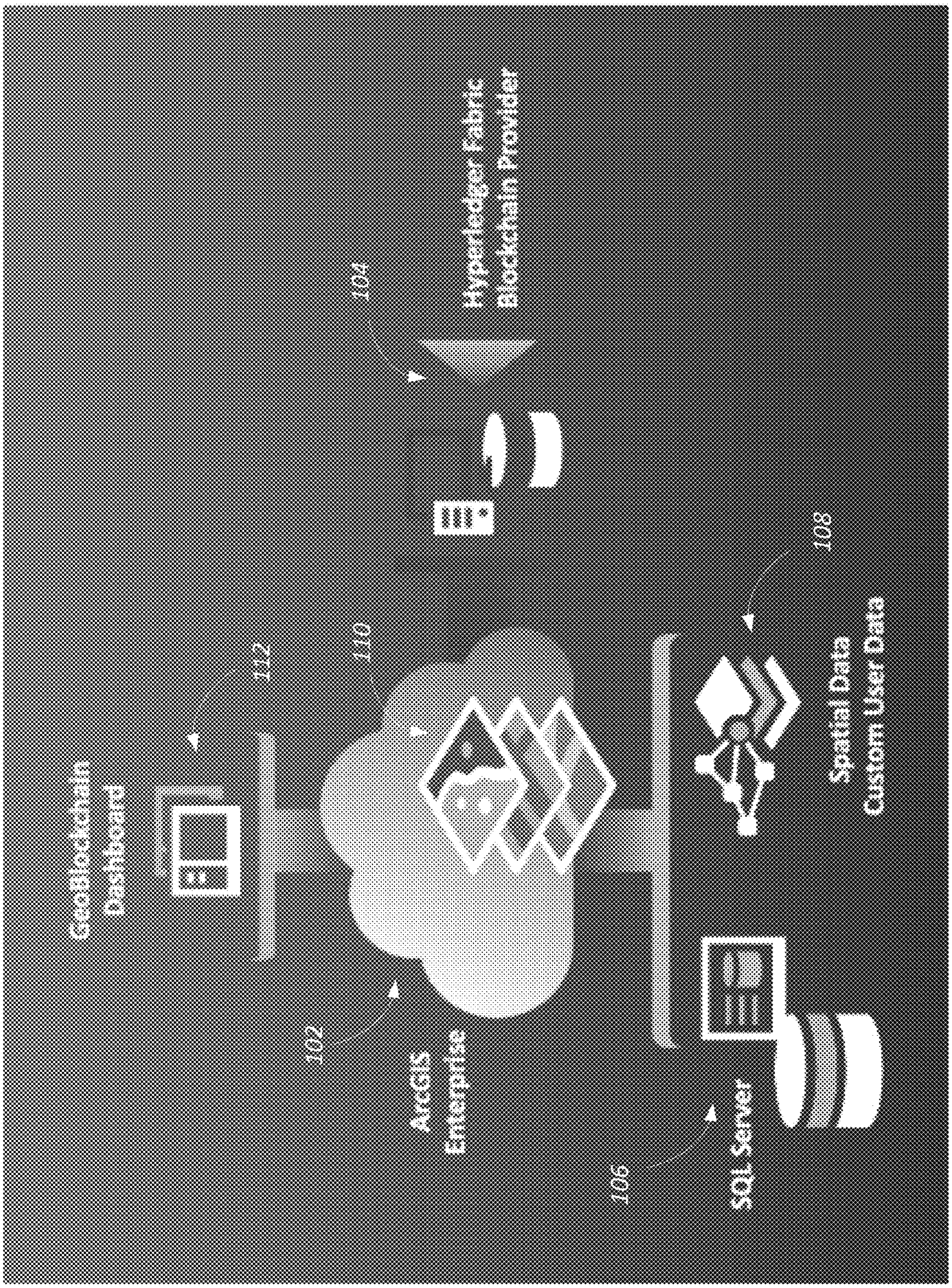
FIG. 1 is a high level block diagram of a GeoBlockchain architecture according to an embodiment.

In the following description, various examples will be described. For purposes of explanation, specific configurations and details are set forth in order to provide a thorough understanding of the examples. However, it will also be apparent to one skilled in the art that the examples may be practiced without the specific details. Furthermore, well-known features may be omitted or simplified in order not to obscure the examples being described.

A blockchain is a growing list of records, called blocks, that are linked (chained) using cryptography. Each block contains a cryptographic hash of the previous block, a timestamp, and transaction data (generally represented as a Merkle tree). A blockchain is typically, but not necessarily, a distributed ledger, managed by a peer-to-peer network collectively adhering to a protocol for inter-node communication and validating new blocks.

All blockchains provide trust, immutability, and transparency. A public blockchain has no access restrictions. Anyone with an Internet connection can send transactions to it as well as become a validator (i.e., participate in the execution of a consensus protocol). Some of the largest, most known public blockchains are the Bitcoin blockchain and the Ethereum blockchain. A private blockchain requires permission to join, as invited by the network administrators. Participant and validator access is restricted. To distinguish between open blockchains and other peer-to-peer decentralized database applications that are not open ad-hoc compute clusters, the terminology Distributed Ledger (DLT) is sometimes used for private blockchains. A hybrid blockchain has a combination of private (centralized) and public (decentralized) features. A sidechain is a designation for a blockchain ledger that runs in parallel to a primary blockchain. Entries from the primary blockchain can be linked to and from the sidechain. The sidechain can otherwise operate independently of the primary blockchain (e.g., by using an alternate means of record keeping, alternate consensus algorithm, etc.).

The present invention provides a tool for the combination, and integration, of blockchain with GIS. This new GeoBlockchain ("GBC") tool can be used to support the analysis of spatialtemporal trends of blockchain transactions via a geospatially-enabled blockchain. For example, a blockchain application for real estate can provide a protocol that allows for a complete real estate transaction, which offers at least the same guarantees for both the signatories and for third parties as current procedures. As such, this technology meets the following criteria: 1) the permissioned blockchain can be controlled by public authorities, and 2) the blockchain can be linked to an official digital ID. For example, an official public authority computer or website can be authenticated using a third party certificate authority, using TLS X.509 certificates. Alternately, instead of the blockchain being controlled by local authorities, it can be controlled nationally, or by a private organization, or any other entity.

In another embodiment, the GBC tool can be used for supply chain technology. GBC is used to interlink with a variety of transportation, logistics, and supply chain activities and methods that rely on organizational and process information. Implicit in both the real estate and supply chain use cases is the locational aspect of these activities. The GBC tool explicitly includes location. In addition, sensor data can be included. With GBC, this data is fused to the location and the geographic feature itself, making it tamperproof.

Geographic Information Systems (GIS), also known as spatial information systems, are digital systems for collecting, storing, analyzing, and visualizing spatial data. GIS is a unique category of information system where the various spatial properties of data can be defined in space as points, lines, or polygons and that can be manipulated by a GIS system for spatial and non-spatial analyses.

GIS can be applied in many ways: urban planning, architecture, preservation of environment, cadaster, logistics, real estate, agriculture, and spatial planning. GIS has the power to analyze and incorporate a variety of datasets in infinite ways; therefore, it can be advantageous for every industry from agriculture, utilities, real estate, health care, finance, land ownership and supply chain to implement spatial information systems.

Blockchain is a way to build trusted data in a distributed, unalterable ledger that records the history of immutable transactions. When a record is submitted to the blockchain it is stored in a distributed network system with multiple ledgers. Transparency and visibility among participants are valuable benefits while the risk of non-accurate data and the overall cost of legal procedures to validate the information are minimized. Blockchain is a method to share and collaborate using trusted data across distributed ledgers and computers. Every participant in the blockchain can validate any information at any time based on assigned rules and roles.

In example embodiments, the GBC tool of the present invention can be used for cadaster-land ownership and supply chain. A Cadaster is detailed recording of land information in a real estate system, which has comprehensive legal documentation, including the dimensions, and precise location of land parcels. Cadaster systems manage and control land ownership with diagrams, plans, maps, and charts to insure reliable facts about a specific land. This information forms the base attributes of GIS-based Cadaster Land Information Systems.

Land Information Systems use cadastral maps to show boundaries and ownership of land pieces and detailed information such as identifying numbers, district names, structure, boundaries, and the area size. Most countries today use outdated cadastral management systems, such as the legacy systems explained above, to manage their land ownership. It is important now more than ever to invest in improving these systems of land ownership to be able to fully trust, manage, and exchange the information regarding land ownership among participants such as owners and legal authorities.

The GBC tool of the present invention can be used to manage real estate transactions. The transaction will be recorded into the ledger with the exchange of a Bitcoin or Ethereum cryptocurrency between two parties. Alternately, traditional financing can be used, with, for example, wire transfer information being recorded. It can also record the details of the land or property transfer within the legal, tax, and government authorities' systems for confirmation and validation of the transaction. In the supply chain industry, business leaders can use blockchain to record and monitor the location of any product, and in embodiments the condition of the product from sensor data. A spatially smart contract can record the sensed condition, attached to the feature with its location. For instance, to record where, when, and how a shipment of fresh coffee was transferred from the warehouse, to the supplier, and finally, to the local store.

As such, the GeoBlockchain tool can answer questions such as where, why, and how. For example, how might a land transaction or a shipping container take place as a trust-trade exchange between different owners and how might that be verified by legal and private authorities? The GeoBlockchain tool uses the idea of "trust-free," the same approach as cryptocurrency's legal regulations. This is different from typical traditional land ownership and supply chain transaction systems by incorporating rules and roles into the blockchain, providing a trust context based on location to the tabular transaction to provide the "trust" of a transaction.

GeoBlockchain Architecture

Blockchain and geospatial are the main technologies that connect the front-end and back-end components. In one embodiment, Hyperledger Fabric, an IBM blockchain cloud service provider, is used as the protocol for the blockchain component. ArcGIS Enterprise, ArcGIS Online, ArcGIS Pro and other elements from Esri provide the geospatial capabilities and are also used as the cloud technology integration platform. Alternately, any other spatial or mapping software, platform or technology could be used. ArcGIS is used herein as one example.

FIG. 1 is a high-level block diagram of a GeoBlockchain architecture according to an embodiment. FIG. 1 illustrates how a blockchain provider 104 (e.g., IBM Hyperledger Fabric) is integrated with a mapping program 102 (e.g., ArcGIS Enterprise from Esri). A server 106 (e.g., SQL server) hosts the transactional or other data associated with a location. Spatial data about the location, along with custom user data (108) is provided. The combined spatial and user transaction or other data is provided to blockchain provider 104 to be encrypted as a block on a blockchain. The block is then incorporated into a map by mapping program 102 as one of multiple layers 110 of a map. The information is then stored on server 106. The map and transactional or other data from the blockchain can be accessed and viewed by a GeoBlockchain dashboard 112, which may be hosted on server 106 or another server.

The blockchain provider thus provides encrypted and trusted information to a geospatial secured cloud from multiple participants that are involved in the transaction or use case (e.g., land ownership use case). The blockchain can be public, private, hybrid, or a sidechain. For a private blockchain, the validators of the blockchain could be, for example, an administrator of the blockchain provider, the two parties to the transaction, and the server 106. Other combinations of validators are also possible. This provides a private blockchain, keeping the data private, while having the data validated by multiple computers for the various involved parties.

The mapping software (e.g., ArcGIS Enterprise) will leverage the spatial information from the blockchain provider, and it will transform, analyze, and visualize data from the blockchain and geospatial clouds in a GeoBlockchain dashboard 112. In various embodiments, blockchain data is standardized transactions, legal contracts, private personal information, and financial information from multiple participants, and in the land ownership case, land ownership information. Land ownership geospatial data includes spatial property data, such as points, lines, and polygons. Spatial data is the geographic representation of the land property parcel data that is exchanged from the blockchain procedure.

Figure 2:
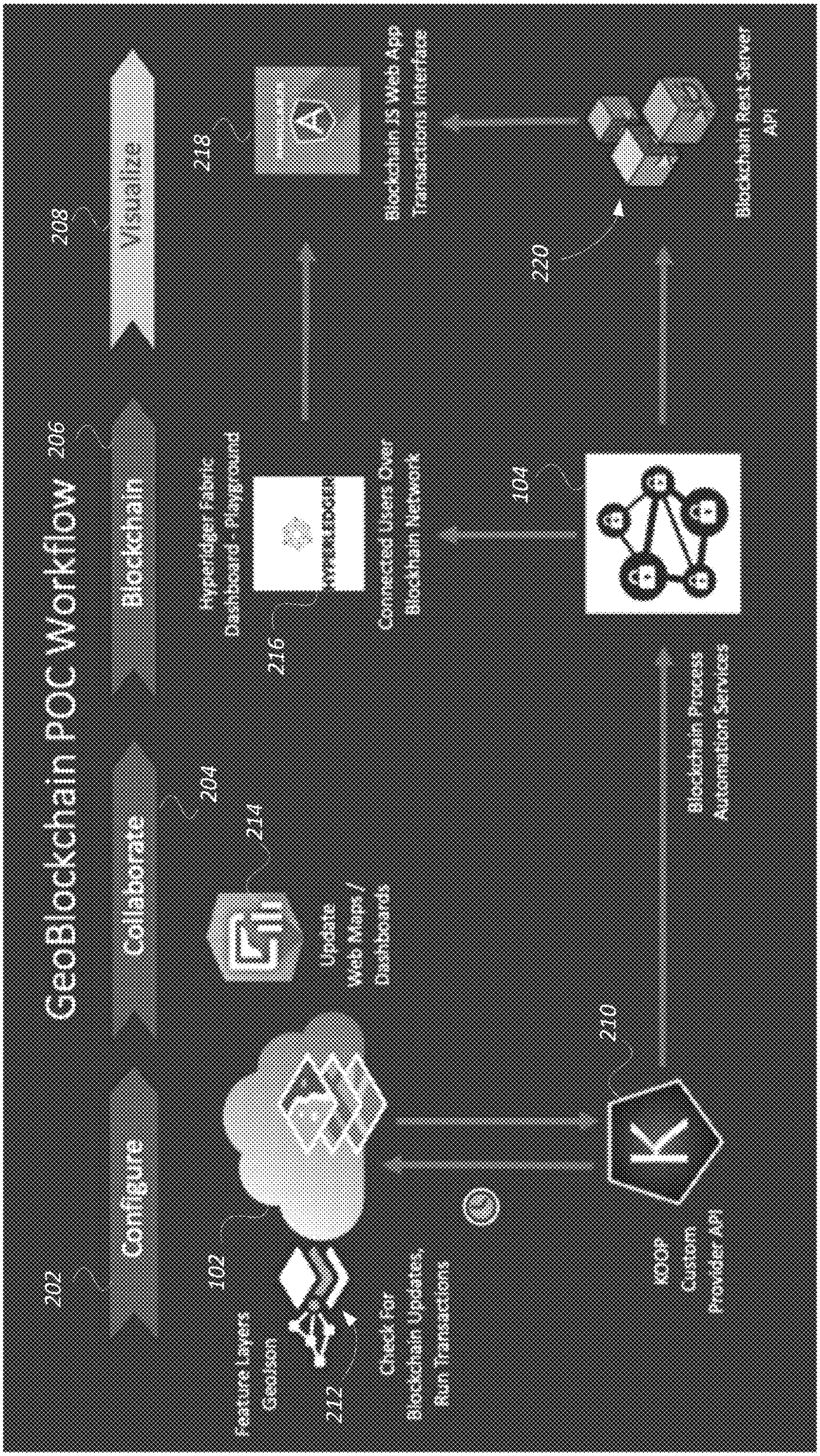
FIG. 2 is a block diagram of a GeoBlockchain workflow according to an embodiment.

FIG. 2 is a block diagram of a GeoBlockchain workflow according to an embodiment. The GeoBlockchain architecture diagram outlines these three main phases with four main important processes: Configure (202), Collaborate (204), Blockchain (206), and Visualize (208) processes.

The Configure process 202 contains the implementation and integration of Hyperledger Fabric 216 API's with ArcGIS Enterprise 102 API's. Hyperledger Fabric API will communicate with ArcGIS Enterprise API through a custom API. In one embodiment, the KOOP API framework 210 is utilized, a compatible provider for ArcGIS Enterprise. The purpose of a custom KOOP REST API is to translate the data record into a geospatial format such as the GeoJSON format. GeoJSON is an open standard format designed for representing geographical features, along with their non-spatial attributes. The features include points (e.g., addresses and locations), line strings (e.g., streets, highways and boundaries), polygons (e.g., countries, provinces, tracts of land), and multi-part collections of these types. GeoJSON provides the capability to geolocate all the raw location data from the blockchain, for example, latitude and longitude coordinates into GeoJSON points. These points are included in GeoJSON layers 212, which are provided to ArcGIS Enterprise 102. On the other hand, ArcGIS Enterprise datasets include spatial information; for example, spatial points, lines, and polygons which is necessary for a land ownership use case as land datasets include polygons, lines, and points.

The Collaborate process 204 uses this custom API 210 with the main goal to share trusted and valid information between blockchain and geospatial platforms. In addition, the two technologies create and update records, either into the ArcGIS Enterprise or into Hyperledger Fabric, or a separate server. A dashboard 214 associated with ArcGIS Enterprise 102 is used to update web maps. The Blockchain process provides the technological foundation for all participants involved in a land ownership transaction. Each participant (buyer, seller, and legal authority) have specific roles and rules assigned within the blockchain. This process provides each participant the ability to agree or not agree with information that is to be recorded into the blockchain ledger. For instance, financial information such as cost and price, legal information such as land titles and land property history, spatial information such as parcel area and parcel measurements.

The various computers of the blockchain 104 access a Hyperledger Fabric 216. Hyperledger Fabric 216 has its own APIs, one of which can be used to access a Blockchain JS Web App transactions interface 218. Another API can be used to access a Blockchain REpresentational State Transfer (REST) Web service 220.

The Visualize process 208 provides a map dashboard component that will be the front-end interaction between the participants into the land ownership transaction.

Figure 3:
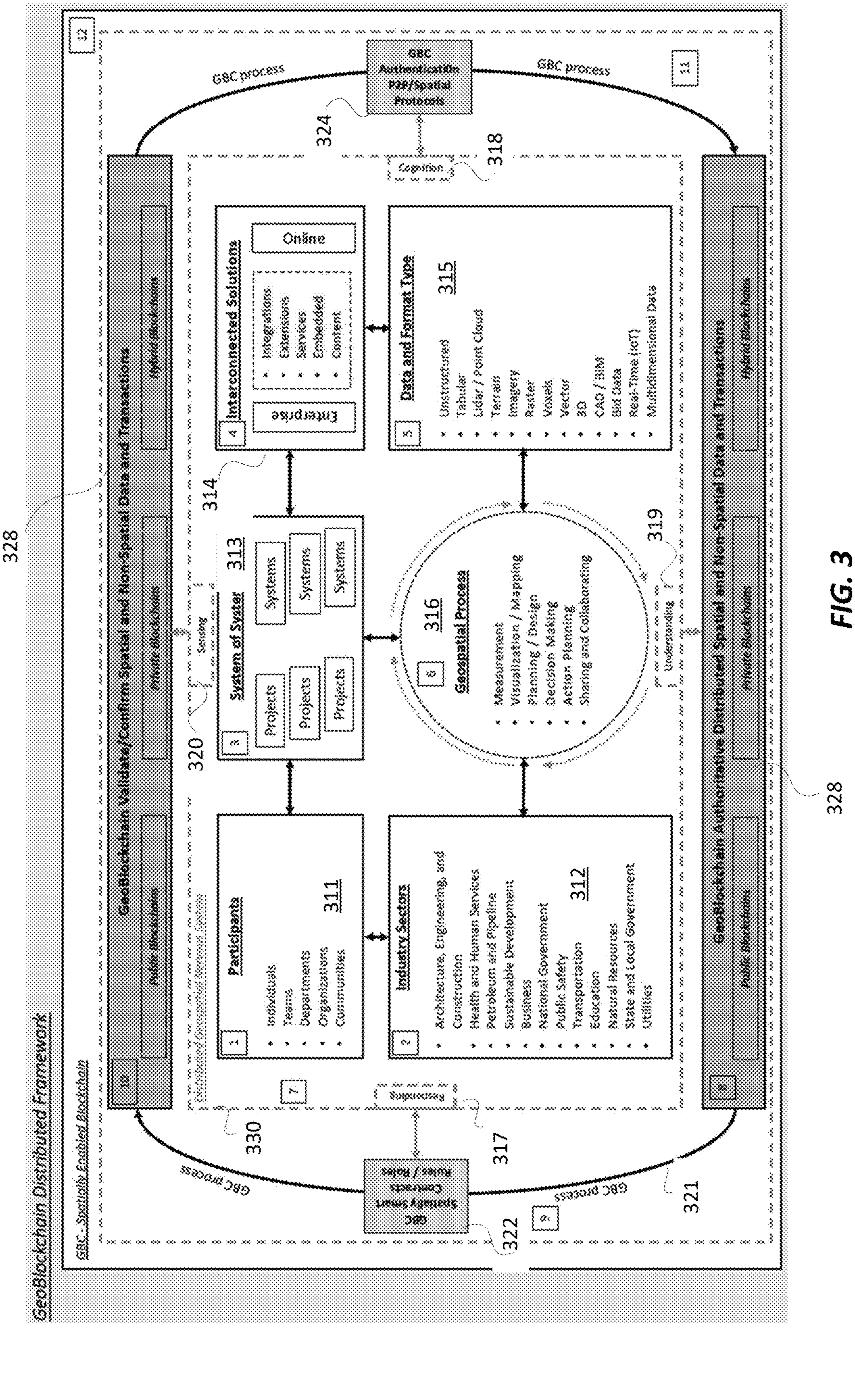
FIG. 3 is a block diagram of a GeoBlockchain framework according to an embodiment.

FIG. 3 is a block diagram of a GeoBlockchain framework according to an embodiment, showing blockchain technology components, processes and infrastructure. GIS block 330 provides GIS technology components, processes and infrastructure. Individuals, Teams, Departments, Organizations, and Communities are examples of the main participants (311) of a System of Systems (313). Those participants perform geospatial processing (316) using a variety of data format and types (315) in order to have solutions and artifacts (314) for their own specific industry sectors (312). This specific geospatial workflow is the backbone of the GIS Infrastructure framework process, which is described as the "Distributed Geospatial Nervous System" indicated by dotted lines 330. Sensing (320), Cognition (318), Understanding (319), and Responding (317) are the main attributes of the "Distributed Geospatial Nervous System" 317.

"GeoBlockchain Authoritative Distributed Spatial and Non-Spatial Data and Transactions" (328) are the Trusted Distributed Ledgers where Public, Private and Hybrid Blockchains exist. A Hybrid Blockchain is the combination of a Public and Private Blockchains. Public is the permissionless blockchain such as Ethereum and Private is a Permission Blockchain such as Hyperledger Fabric. Through the GeoBlockchain ("GBC") process 321 and the agreed Spatially Smart contracts (322) Participants (311) from different organizations will agree on specific rules and roles that will shape the spatially smart contracts (322). The spatial smart contracts include predefined logic, rules, and roles for GBC participants based on the use case and workflows. GBC process 321 leverages spatial smart contracts for spatial and non-spatial transactions. The overall Spatial Location Intelligence process (311-316) must be verified, validated and confirmed at the GBC process during step 328. Step 328 performs validation and confirmation of transactions that are happening based on spatial contracts within the blockchain consensus. If all confirmations through the multi blockchains (Public, Private, Hybrid) are also authenticated with the P2P protocols and Spatial protocols (324), then they are recorded "badged label" as Trusted and Authenticated into the Blockchain Ledgers 328. The protocols 324 create a spatial hash key authentication after the validation and confirmation of spatial data and information products. Blockchain ledgers 328 store spatial hash keys into the distributed blockchain so they are available for use into the sync GIS System. This is the result of the "GBC—Spatially Enabled Blockchain" of FIG. 3.

Another embodiment enables authenticating location. For example, when someone signs (physically or digitally) documents, there may be a need to state the signing location. Thus, the location of the signer can be authenticated/recorded. Also, if there is a witness for the signature, both the signer and witness location and time can be captured. This can be part of a smart contract execution.

The validation performed by blockchain ledgers 328 can include authenticating data that is attached to other data, i.e. metadata. The data may include information about the quality or condition of an object and those 'attributes' are attached to the feature. So the geographic feature has non-geographic data associated with it. It can also pertain to the quality/accuracy of the location.

Real Estate Sale Embodiment.

In a real estate embodiment, a grantor provides a property description. This can be via a title company, attorney, surveyor or others. This is registered in a GeoBlockchain. At conveyance, the grantor, grantee and description are linked and registered in the GeoBlockchain. This can be in the form of a deed, deed of trust, mortgage, and other forms. All parties are tied together in the GeoBlockchain. Subsequent conveyances are referenced and linked to this GeoBlockchain entry. Title companies can link to this entry. 'Copies' of this transaction can be viewed/used as badged (meaning authenticated by the GBC, e.g., with wet ink) authenticated copies. In embodiments, the badge is an authentication hash output (GBC Framework 324) with a badged hash number stored into the Blockchain as an authoritative key (GBC Framework 328) This can be a private blockchain or public blockchain.

The transaction is a block that is added to a blockchain by the electronic file block being sent to a distributed group of computers for calculating the blockchain and acting as validators. A large (public) or small (private) group of validators can be used. For example, the validators may be the grantor, grantee, the involved real estate agents, the blockchain provider, the title company and the country recorder, or any subgroup or larger group of computers.

Some embodiments can have a workflow that uses an official property recorder, but other workflows (eRecording) go straight to the GeoBlockchain without involving a recorder. The seller signs a transfer deed to the buyer, and an electronic copy is provided to the blockchain computers, which link it with the chain of title. The county recorder and insurance company computers store a copy as the latest ownership information in their copy of the blockchain. Alternate implementations of GeoBlockchain eliminate the need for a deed or title registry. Land ownership can be described as parties, rights/restrictions and geometry (spatial extents or geometry).

The blockchain transfer document is linked to a layer in a map generated by a mapping program (e.g., Esri's ArcGIS). A layer is a visualization or representation of data which can be files, databases, webservices, etc. Layers are represented on a map, or mapping application (See FIG. 1, 112 and FIG. 2, 214) through a geospatial process (see FIG. 3, 316). In one embodiment, the layer does not contain the blockchain itself, but rather a link (e.g., an API) to the stored blockchain in a mapping company blockchain server. Access to the map may be provided to the public through a URL available at the country recorder, insurance company, realtors, etc. Upon access of a parcel in a map, the blockchain data will be retrieved from the map server using the link tag in an ownership layer associated with the parcel layer. The ownership information, including data such as the last sales price or history of sales, is retrieved and displayed on the map. In one embodiment, only the owner and last sales amount is displayed, with additional details provided upon clicking on the information, zooming in, or by other means. In embodiments, a notification is provided of any property being recorded/registered/transferred that overlaps previously recorded/registered/mapped property. This notification can be linked to fraud detection systems that notify people if anything is recorded in their name. GBC gives the ability to notify property owners if anything is recorded that overlaps their property (polygon, line, etc.). This is a type of geofence sending alerts of any activity inside or outside a defined area.

The geoblockchain layer may be linked to a location in just one layer, or may also be linked to other layers. It may be desirable to exclude thematic layers which may change over time. Thus, many years in the future, when the other layers of the map have changed, the geoblockchain can still be shown to correspond to a basic, rarely changed layer of the map. In one embodiment, multiple blocks of data from different sources are included in the same layer. E.g., that data could be flood plain or flood hazard data from FEMA, a title report from a title company, hazardous waste data, buried fuel, tanks, etc. Alternately, the data and identifier of each authoritative source may be in its own layer, or related sources may be combined in different layers in different geoblockchains.

The GeoBlockchain can combine data from multiple authoritative sources. For example, the flood plain or flood hazard data from FEMA, hazardous waste locations from the EPA, title report from a licensed title insurance company, the license of the title insurance company from a regulator, the zoning map from the city, recorded CCRs from a HOA, etc. could be combined into a GeoBlockchain compilation. Support for government approvals could also be provided, such as a licensed engineer's soil report. The soil report could be submitted to a government reviewer as a GeoBlockchain including the soil engineer's license. The government approval could be added to the GeoBlockchain, and the combination can be added to the compilation. The dates of the submission, approval, and real estate transaction can all be validated by the GeoBlockchain.

Figure 4:
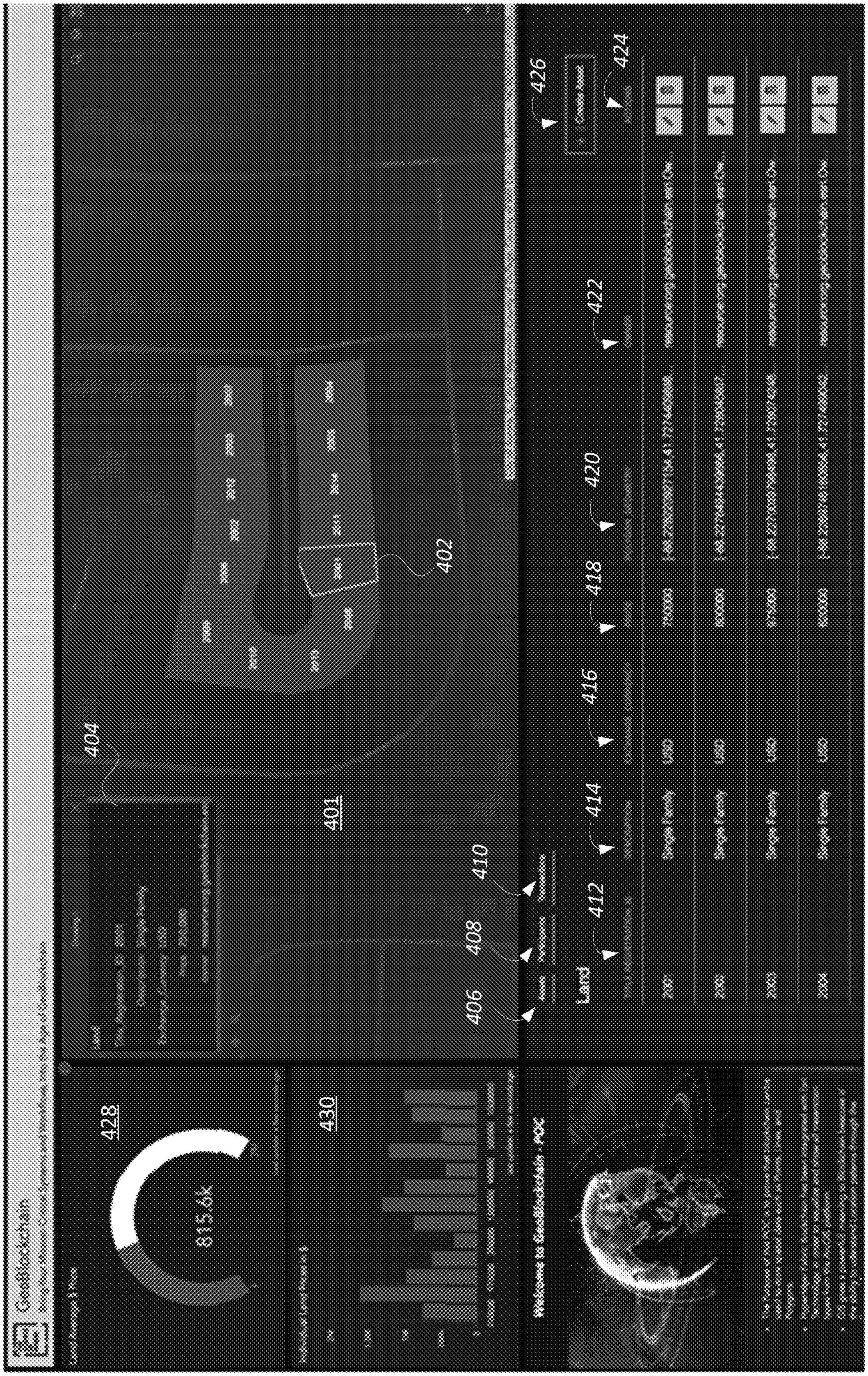
FIG. 4 is a block diagram of a GeoBlockchain dashboard for real estate according to an embodiment.

FIG. 4 is a block diagram of a GeoBlockchain dashboard for real estate according to an embodiment. This dashboard is an artifact that is an instantiation of a GeoBlockchain for land ownership transactions. Through this dashboard, participants (landowners, customers, and other stakeholders) can exchange (buy or sell) land through the blockchain component, and instantly view the results through the GIS component. As displayed in FIG. 4, a single-family property parcel 402 is described in a window 404 with ID 2001, and USD price of $750,000. It was transferred from Owner A to Owner B. This prototype dashboard visualizes the property locations on a map and can answer "where" the transaction occurred and "why" the event happened based on historic transaction events. The "what" can also be provided, indicating the rights conveyed. For example, a zoning map would show restrictions such as RRRs in land (rights, restrictions, responsibilities).

The dashboard of FIG. 4 has a map 401, on which a polygon representing parcel 402 is displayed. Below map 401 are multiple tabs for more information about various parcels on map 401. A tab 406, shown, sets forth the assets. Tab 408 provides details on participants, and tab 410 provides details on transactions. The displayed assets tab 406 has multiple columns of information, with a title registration ID column 412, description column 414, exchange currency column 416, price column 418, parcel (polygon) geometry column 420, owner column 422 and an actions column 424. Examples of actions are to add an amendment on the current transaction by clicking on the pencil "edit Action icon." For example, documents that will need to be submitted or resurveyed parcels. The delete Action icon is to cancel the draft records before submission to the GeoBlockchain for Verifications and Confirmation. Note that one cannot delete any transaction from the GeoBlockchain, since it has immutability and provides a secure recorded history with events that cannot be deleted or hacked. An icon 426, when activated, provides a pop-up window for creating a new asset to add. Widgets 428 and 430, shown separately in FIG. 4A, provide various statistics, and are examples of widgets that can be provided.

Figure 4A:
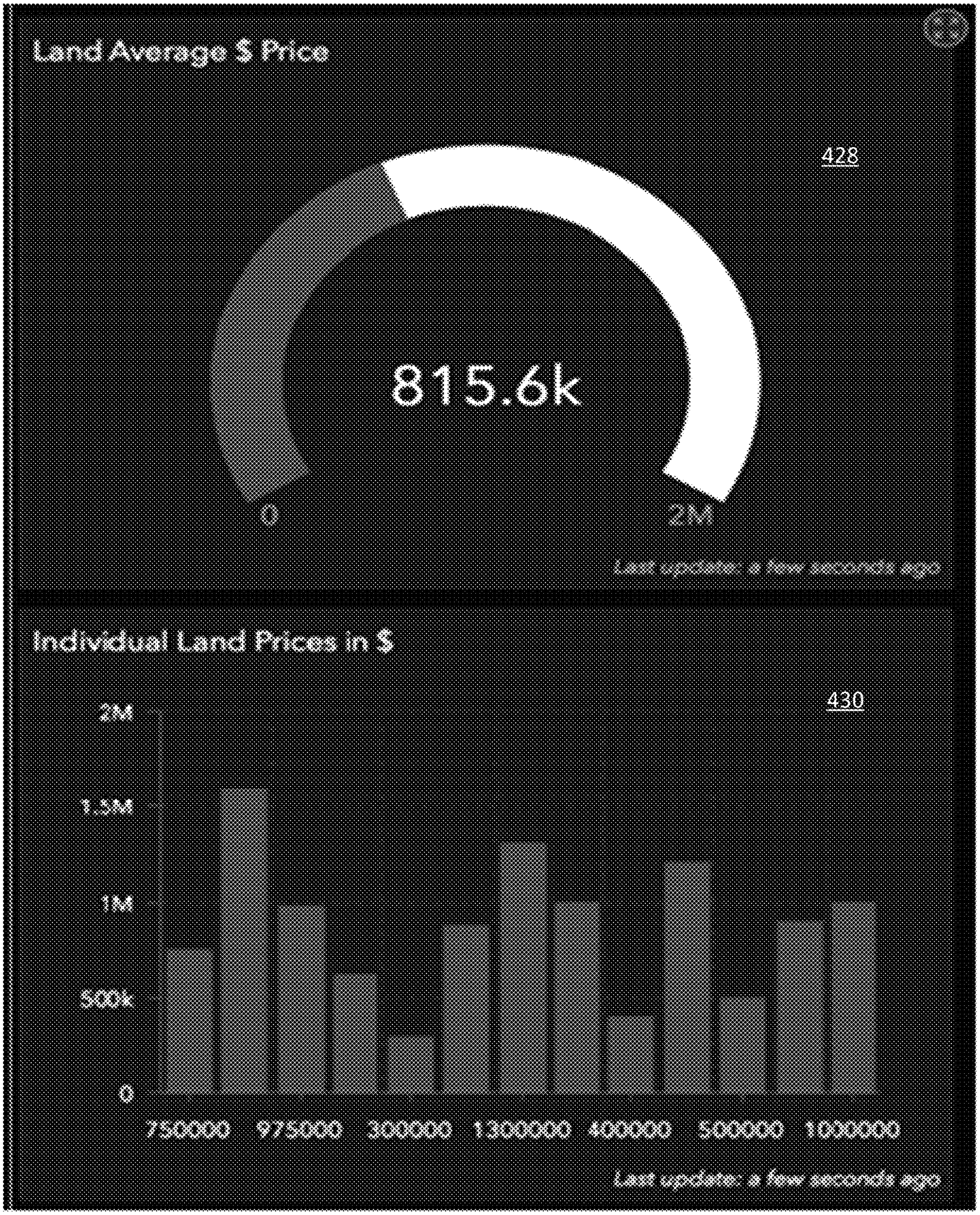
FIG. 4A is a diagram of specialized widgets of the GeoBlockchain dashboard of FIG. 4 according to an embodiment.

FIG. 4A is a diagram of specialized widgets of the GeoBlockchain dashboard of FIG. 4 according to an embodiment. Widget 428 shows the average land price for the area on map 401 of FIG. 4. This can change with the area displayed on the map, as the user moves the map location or zooms in or out. Widget 430 shows the breakdown of the prices for the individual parcels, both as a number along the x-axis, and as a bar graphic in the y-axis direction. The power of geospatial technology is applied to the dashboard with the addition of the specialized widgets that display statistics from the blockchain and geospatial technologies. The GeoBlockchain tool web application artifacts allow participants and stakeholders to track overall land ownership and various statistics such as the average price at the selected geographic location and/or examine the individual land price using geospatial and blockchain statistical tools. There are a wide variety of other widgets that could be provided. For example, a widget could indicate average prices over the past 5-10 years. An average price per square foot for a particular area can be shown. Demographic information about the buyers and sellers can be provided, such as their age ranges, number of children or pets, etc.

FIG. 5 is a table of GeoBlockchain participants and roles for a land ownership example, according to an embodiment. In this embodiment, artifacts are created with the integration of Hyperledger Fabric Cloud and ArcGIS Enterprise. GeoBlockchain participant roles are set forth in FIG. 5. The cloud-based GeoBlockchain Web Dashboard of FIG. 4 can be used by participants. Different roles with specific profiles are used, and all transactions (spatial and not spatial) are recorded into the GeoBlockchain.

In one embodiment, the GeoBlockchain is a private blockchain, with validating computers for the blocks of the blockchain being limited to those granted permission under the established rules and roles for the private GeoBlockchain. The validating computers can be all the participants listed in FIG. 5, or a subset. Alternately, additional validating computers can be used, or other GeoBlockchains can be linked. For example, all the county recorder computers in a state may form their own private GeoBlockchain, with the recorder GeoBlockchain being linked to a parcel map. A separate FEMA GeoBlockchain could also be linked.

Copies of the GeoBlockchain are maintained on each of the validating computers. However, new users may be directed to a particular computer, such as a server hosting the government authority website, for access to the GeoBlockchain maps.

Figure 6:
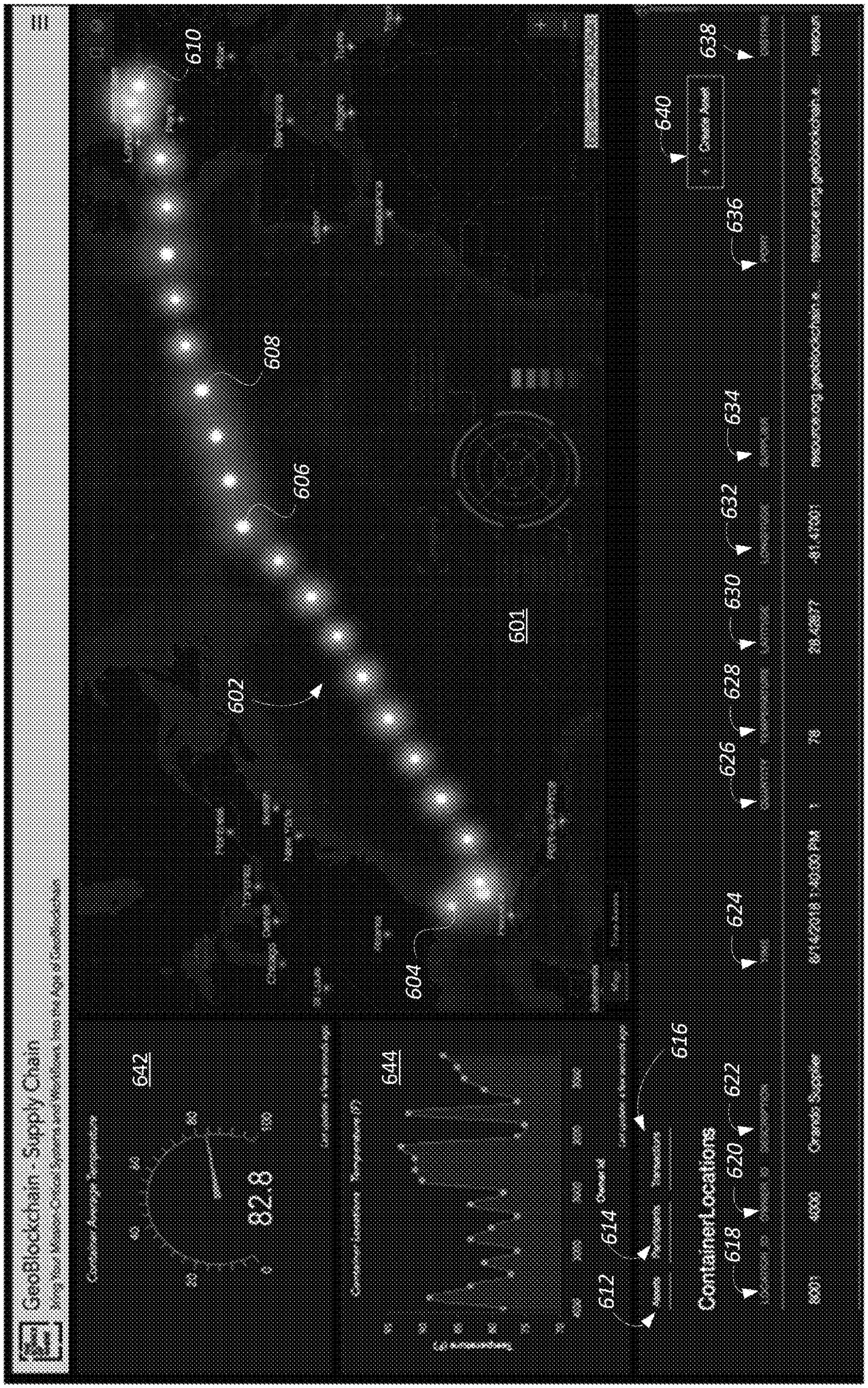
FIG. 6 is a block diagram of a GeoBlockchain dashboard for a supply chain according to an embodiment.

FIGS. 4-6 illustrate one embodiment, and other variations are possible. For example, another participant could be a flood plain map provider, such as FEMA (Federal Emergency Management Agency). Additionally, a hazardous waste map provider can be included, or a government zoning map indicating permitted land use.

The purpose of the unique roles and rules is to provide trust and transparency through the land ownership workflow process. Trusted Organizations, in this case, are private and legal authorities who orchestrate and manage the interaction between participants in the GeoBlockchain and for better interaction with matters related with tax regulations and legal concerns. The orchestrators are responsible for the approved rules, roles, and the smooth transaction between participants in order to establish transparency and confidentiality. The goal is to have integrity through the process and between the participants.

The GeoBlockchain satisfies an immutability criterion with the ability to answer questions related to "where and why." The "where" is the location of the land ownership transaction such as the real geographic representation of the property parcel. The "why" and "what" is the recorded history of the of all the approved land ownership transactions into the GeoBlockchain.

A Performance criterion is satisfied, providing a short total time for the land ownership transaction to be completed. The GeoBlockchain system provides resources in the cloud in one embodiment. Thus, available resources can be modified and adjusted based on systems transaction load. In addition, the entire land ownership process is faster than the traditional land ownership transaction process as most of the mediators are not needed and the process is more automated. The time needed from the beginning to the end of the land ownership transaction is less as it requires less face-to-face interactions, fewer middlemen, less bureaucracy, and wait times.

Supply Chain Embodiment.

FIG. 6 is a block diagram of a GeoBlockchain dashboard for a supply chain according to an embodiment. The GeoBlockchain web application artifact for the supply chain case allows participants and stakeholders to track overall supply chains and various statistics using geospatial and blockchain statistical tools. A map 601 shows the route 602 of a tracked product during shipping. This can be done with a GPS tracking system on a container in which the product is shipped. Such a tracking system can also have additional sensors, such as a temperature sensor. Other examples of sensors are sensors for vibration, humidity, shock, door opening, etc. A dot 604 shows a container location with the associated temperature graphically illustrated with a blue dot, indicating a temperature below a desired maximum temperature. Dots 606 to 608 are red dots, indicating a temperature above the desired maximum temperature. Each dot corresponds to a block of captured data that forms one block of the blockchain. In addition to location and temperature, other data is captured in the block, such as the data shown below map 601 on the dashboard.

Below map 601, three tabs are shown for displaying additional data. An assets tab 612, illustrated, provides data on the asset tracked—the container. A participants tab 614 would show data on the various participants in the shipping supply chain. The table of FIG. 7 illustrates some examples of those participants, which can include an administrator, supplier, port, distribution center, shipping and trucking participants. A transactions tab 616 provides data on "transactions," which are events that are recorded on the blockchain. In this example, the event is a status of the container at a particular location and time-including the temperature and other parameters. The locations and corresponding event information are recorded as blocks in the blockchain. Thus, the line of dots 602 visually represents the GeoBlockchain, with each dot corresponding to a block in the GeoBlockchain.

In assets tab 612, various columns of data are shown. In the example of FIG. 6, that data includes a location ID 618, owner ID 620, description of the owner 622, time 624, quantity of product 626, temperature 628, location as a latitude 630 and longitude 632, supplier 634, port 636 and distributor 638. Additional assets can be created using an icon 640 to provide a pop-up window or other display. In addition, statistical and other data can be provided using various widgets, such as widgets 642 and 644, shown separately in FIG. 6A.

Figure 6A:
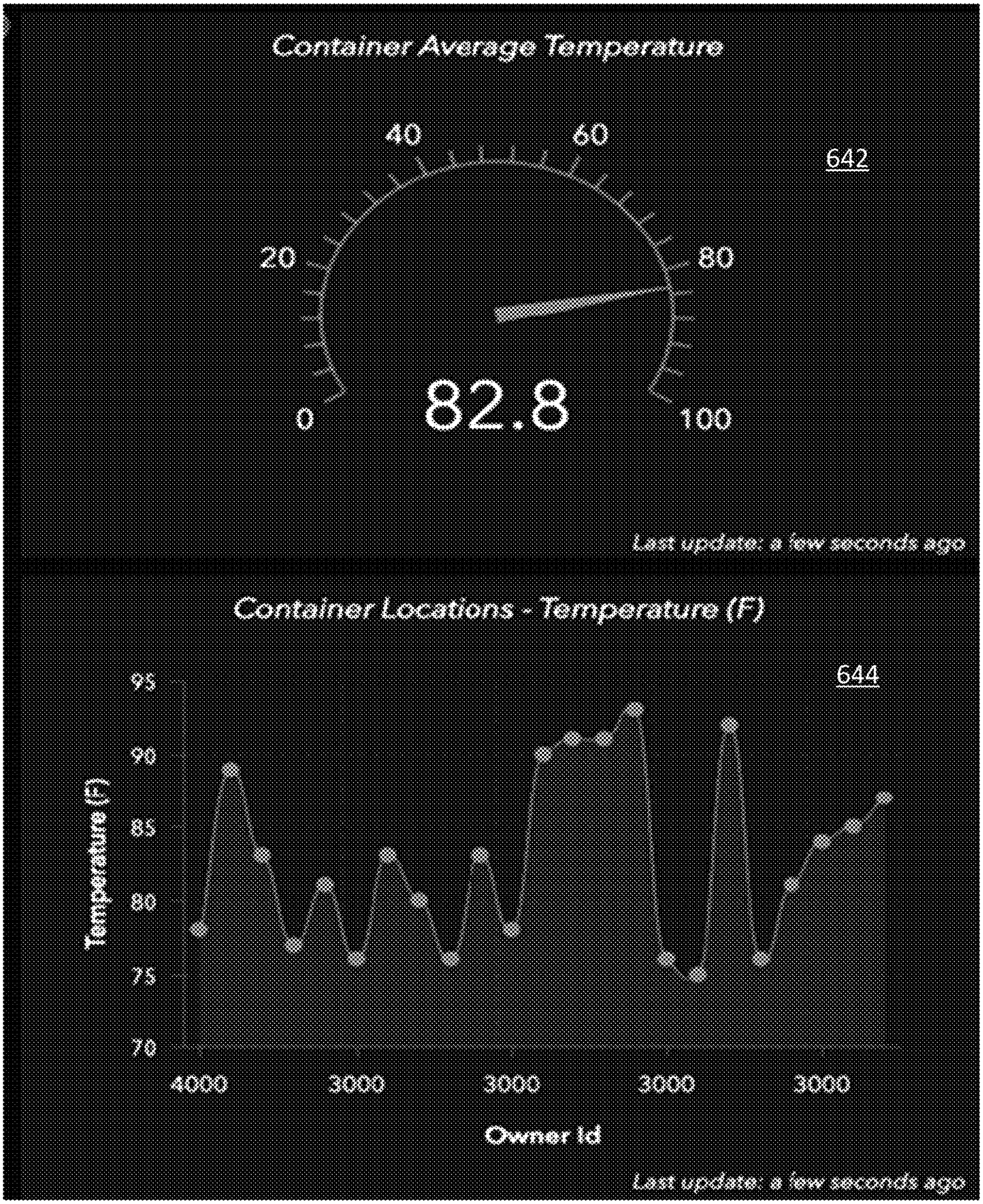
FIG. 6A is a diagram of specialized widgets of the GeoBlockchain dashboard of FIG. 6 according to an embodiment.

FIG. 6A is a diagram of specialized widgets of the GeoBlockchain dashboard of FIG. 6 according to an embodiment. Widget 642 shows the average temperature of the container over the entire trip. Widget 644 shows the details of the individual container temperature readings at each recorded location (such as by indicating the owner, or custodian, of the container at that point).

FIG. 7 is a table of GeoBlockchain participants and roles for a supply chain example, according to an embodiment. The participants in this example include an administrator, supplier, port, distribution center, shipping and trucking participants. Each has specific controlled roles, set forth by the GeoBlockchain tool rules.

Coordination Across Layers

Figure 8:
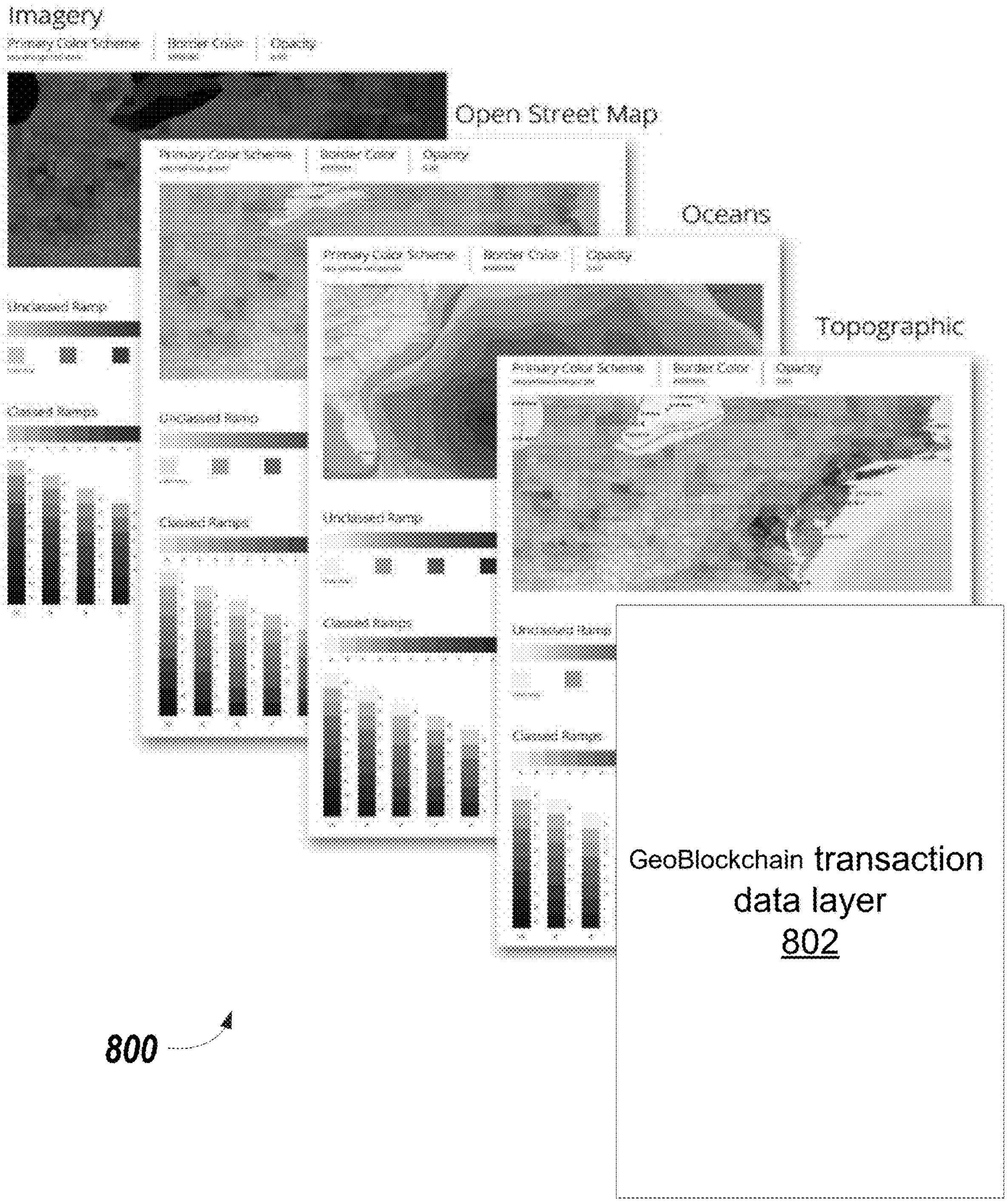
FIG. 8 is a diagram of multiple map layers according to an embodiment.

FIG. 8 is a diagram of multiple map layers according to an embodiment. Since modern GIS and Web Maps may be composed of many layers that overlay, it is important for the different layers to visually harmonize, look like they were designed to work together, and remain legible even under reduced transparency (for example, so you can see layers beneath other layers). This is often called a "mash-up" where multiple data sources are brought together, often on the fly, and have to work together. In certain embodiments, custom map specs coordinate the styling of thematic data (e.g., colors, line weights, opacity amounts) and are automatically coordinated with a basemap tiles. Rather than make the map author do all of the tedious work of picking and styling each of these small elements of a map (which can be done manually), an automatically generated pre-packaged and aesthetically pleasing default map is created. Thus, thematic data in additional layers will "harmonize" with the base map. In some cases, any layer can be designated a base map such that the other layers are harmonized to that specific layer.

In some embodiments, the base map data is a first layer and includes thematic data, wherein the thematic data includes one or more of a color scheme, line weights, opacity, text font(s), and text size(s), receiving data for one or more additional layers, each additional layer including thematic data, changing the thematic data for the one or more additional layers to match the thematic data of the base map, and superimposing the base map and the one or more additional layers. In some cases, thematic data associated with the one or more additional layers that is not found in the base map is not changed. Various layers can include imagery, street locations, water, topography, etc. According to the present invention, an additional layer 802 is added, containing the blockchain transaction data.

Certain embodiments provide multiple blockchain layers. For example, one layer can address ownership of a parcel, as discussed above. Another layer may indicate floodplain information, with a link to a blockchain authenticating the source as an official FEMA server, and indicating that it is current. This allows tying multiple authoritative sources to one parcel (e.g., property ownership registry and a certification that the property does not lie with in a special flood hazard zone).

Most parcels have an address tied to location. The GeoBlockchain allows linking the address with both the transaction document and the parcel and parcel ID in one layer, or across layers.

The GeoBlockchain layers provide access to attribute information for feature layers by opening the layer's attribute table, clicking on a feature using an Identify tool, or utilizing HTML pop-ups. A user can work with the map layers to edit data and add new features. The user can drag and drop layers as inputs into analytic models using geoprocessing, and model results are often viewed and explored as new map layers. A number of toolbars can be provided for working with map layers, depending on the type of layer. For example, a user can work with image layers using a special image classification toolbar.

Metadata.

Map layers in ArcGIS typically have the metadata stripped off, as not needed for map manipulation by users. In the GeoBlockchain tool of the present invention, the metadata can be stripped off the layer, but is included with the block data and is encrypted into a block of the GeoBlockchain. The metadata includes, for example, the standards used to collect the map data. With badging capabilities, users will know if metadata is attached or has been modified.

Authoritative Badging.

Certain location data, or layers, may be "badged" by tagging them as coming from an authoritative source. The badge can also indicate if the data is current. Examples of authoritative sources include FEMA for a flood zone map layer, a county for a zoning map layer, a weather bureau for a climate map, and various U.S. Geological Survey maps of topography, mineral resources, hazardous waste sites, etc. Each of these maps can be badged based on the GeoBlockchain participants verifying the source of the map (e.g., a government entity, title company, etc.). In one embodiment, the blockchain can be linked to an official digital ID. In one example, the blockchain can also encode an official public authority computer based on its IP address, or website URL as authenticated using a third-party certificate authority, using TLS X.509 certificates. A visual indication of the badge can be in the form of a particular icon displayed to the user in association with the authoritative location data.

Blockchain authentication can also be used to authenticate those adding analysis to maps. Other examples of authoritative sources could be a surveyor for the polygon of the parcel, a title company for the chain of title, an attorney for compliance with covenants and restrictions, etc. In one embodiment, a rule set is provided for GeoBlockchain participant communications.

Each authority's map can be included as a different layer on a combined map. For example, an address can be a separate layer from the parcel geometry, and badged as coming from an addressing authority. Addressing authorities exist in each state of the United States, and in other countries. The addresses can thus be authenticated as coming from a particular, authenticated government authority. The GeoBlockchain can then link the address, a transaction document and parcel geometric description, which may come from three separate layers.

Authentication of generic authoritative data and the GeoBlockchain authentication persists with the data (i.e. authentication in the form of badges in information products, maps, web maps, and apps). This authentication includes the necessity and attributes of metadata. The GeoBlockchain is used when accessing the data via a data layer, web service, file or any digital format.

An example data set is the FEMA Flood Maps [fema.gov] which are official maps when certain restrictions are adopted by local government. This is directly related to the property owner's ability to qualify for federal flood insurance [fema.gov]. If the official local government parcel and/or topographic map is used (also GeoBlockchain registered) to overlay on the flood map to determine if the property is in the flood plain, this determination (in or out) can also be registered, eliminating the need for this certification on the HUD-1 form when transferring real estate.

There are many national official data sets that GeoBlockchain can be used to validate including Census, Geodetic Control, Soils, Wetlands, Protected Lands, Administrative Units, Hydrography, Water, Natural Resources, Leases, Cultural Resources, Land Cover, Land Use, Federal Lands, Tribal Lands and many others. National government, local government, planning agencies, private sector and others use these data to make critical decisions. Authenticating the current and correct data will be achieved with GeoBlockchain.

Zoom Levels.

In addition to multiple blockchain authenticated layers, there can be separate authentication for various zoom levels of a layer, or multiple layers. Alternately, a range of zoom levels that is authenticated can be provided, with zoom levels outside the range not being badged with a GeoBlockchain authentication. For example, an authoritative badge icon would appear for authoritative zoom levels, but would not be displayed for zoom levels outside the authoritative/authenticated range.

Location Validation.

In one embodiment, the location provides a validation of where something occurred, just like facial recognition can provide validation of a user's identity. The location can be determined and cross-checked with various sensors. GPS/GNSS data can be used to validate a location, and can be cross-checked with different sources of GPS and location data, such as U.S., Chinese, Russian and private satellite systems. Also, IoT (Internet of Things) sensors can be used to provide or validate location, such as a sensor mounted at a particular location in a port, housing development, etc. The IoT sensor may also provide other data, such as temperature, time, humidity, etc.

In one embodiment, a smartphone can act as an IoT sensor, providing location data. For example, the phone can show the location where a person gets a Covid vaccine, which can be matched with a pharmacy location where the vaccine was administered. The location can be considered authenticated if the two locations are within a specified threshold of each other (e.g., 500 meters).

In embodiments, the location is indicated as a geometry, such as a point, line or polygon. Alternately, or in addition, the location can be indicated as a street address. These geometric components indicating location are included in a block of the GeoBlockchain. The polygon can be indexed to a longitude and latitude of one point on the polygon. Thus, a limited amount of data needs to be encrypted into a GeoBlockchain, limiting the computing and memory load of the GeoBlockchain. In the supply chain example, only a latitude and longitude need be registered in the GeoBlockchain, and the spacing between blocks can be significant amounts of time or distance, such as every hour or just every day, or every 50 miles.

GBC Framework with On-Premise Environment

Figure 9:
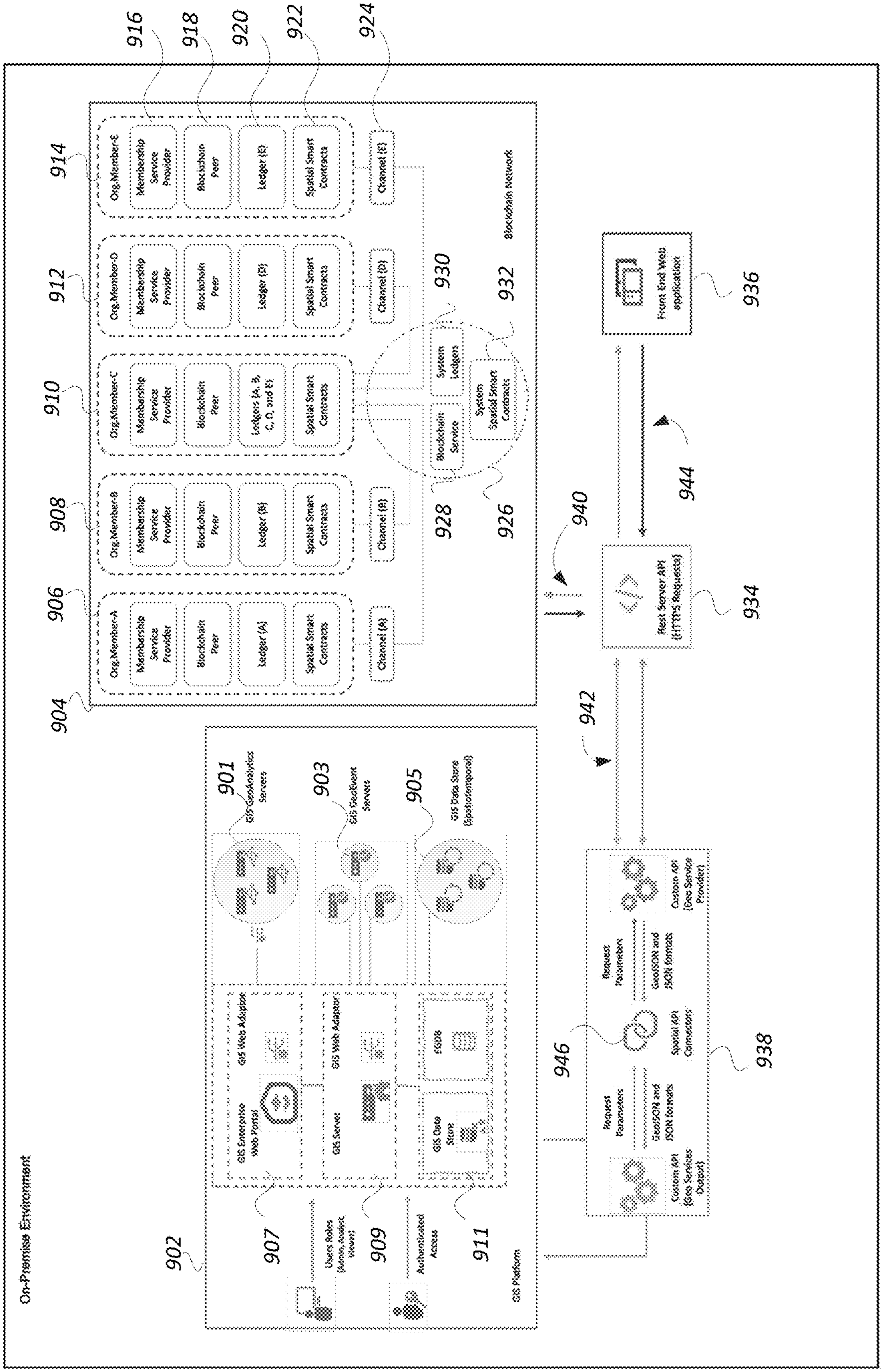
FIG. 9 illustrates a GeoBlockchain framework with an on-premise environment.

FIG. 9 illustrates a GeoBlockchain framework with an on-premise environment. A GIS Platform 902 provides GIS technology components, processes and infrastructure. A blockchain network 904 provides blockchain technology components, processes and infrastructure. Blockchain network 904 includes multiple organization member computers, such as member computers 906, 908, 910, 912 and 914. Each member computer includes a membership service provider 916, blockchain peer 918, ledger 920 and spatial smart contracts 922. Membership service provider 916 is blockchain certificates that are registered with the blockchain service (FIG. 9, 928) and also includes a score mechanism that allows members to invite, accept, or reject new members and to kick out existing members if there is a violation through the blockchain network. Blockchain Peers 918 are identified participants from a unique organization. For example, you can have multiple peers from the Supply chain tracking company such as admins, drivers, analysts and third-party companies that work with the main tracking company. For example, local tracking companies could be in the country, state, city area. Spatial smart contracts 922 include predefined logic, rules, and roles for GBC participants based on the use case and workflows. Each member computer has a channel 924 for interconnection with the other computers.

A blockchain process cycle 926 leverages the spatial smart contracts for spatial and non-spatial transactions. A blockchain service 928 forms the blockchain with the provided smart contracts. System ledger 930 is the main ledger, and each member has a copy of their own ledger. In embodiments, this is a distributed system and not centralized. For example, a ledger should be transparent and able to be traced The system ledger stores everyone's blockchain, while member ledgers just store ones for that member. System special smart contracts 932 is a collection of all the member smart contracts, while each member just has its own. The System spatial contracts include all the logic (the all "if else" scenarios between all the organizations, participants peers). The member agrees to be responsible for itself (what the member is responsible to do) and has access to that procedure. Also, members are responsible to execute only the "if then else" statements procedures when their own part is active for execution. Validation and confirmation of all transactions happens based on the spatial contracts within the blockchain consensus. A spatial hash key authentication is created after the validation and confirmation of spatial data and information products. Information products are maps and apps with data mashed together for analysis, visualization and communication. These are typically purpose-focused. For example, information products include production maps, dashboards, web applications and mobile applications. Those are the outputs and UI visual interfaces for users to do their workflows and to make any decision making Adding spatial information into smart contracts validates the location of the signers, assets, and other location-specific needs. For example, when purchasing a car, is the car where the seller says it is? Is the seller where they say they are? A geofence can be put around the item/person and can be time dependent. GIS data store 905, 911 stores spatial and non-spatial data and tables that are part of the Information products such as Web Maps and Web Applications. The Information Products are stored on the GIS Enterprise Portal 907. The GIS data store 905 data is published as web REST services that are stored into the GIS Server 909 and available also into the GIS Enterprise Portal 907 in GIS platform 902, in order to be used for the creation of information products, as shown in FIG. 9. Spatial hash keys are stored into the distributed blockchain and available for use into the synchronized GIS Platform 902.

Blockchain network 904 communicates with a REST (Representational State Transfer) Server 934 via an API Communication 940. A GIS API process 938 requests blockchain parameters and processes spatial hash keys to assign to GIS information. REST server 934 communicates via interface 942 with GIS API process 938 for validation, confirmation, and sending authoritative spatial keys to GIS REST spatial connectors 946. REST server 934 communicates over an interface 944 with a blockchain front end management console 936 to track and monitor authoritative transactions.

GIS Platform 902 provides standard GIS technology components, processes and infrastructure, and adds the GeoBlockchain components. GeoAnalytics servers 901, GIS GeoEvent servers 903 and GIS Data Store database 905 are added. The final GeoBlockchain maps are stored in GIS database 905. Data is collected and stored into GIS database 905, then data is published as web services to a GIS Server 909 and available through the GIS Enterprise Portal 907. Module 911 includes two components: (1) GIS Data Store and (2) Enterprise Geodatabases. (1) GIS Data Store includes spatial data and cold be a relational, tile caching, and/or graph data stores. GIS data store 905 is an optional module to have multiple spatiotemporal big data stores connected to the module 911 data store (1). The module 911 Enterprise Geodatabases (EGDB) (2) can include SQL, Oracle and PostgressSQL, and other databases that could include spatial and non-spatial data.

Through the portal and information products users can execute their workflows by using Web Maps, Web Apps and Analysis tools. Then Web Services Rest requests communicate with the Spatial API connectors (946) through the custom API process (938) for sending (back and forward) the parameters (942) to blockchain Rest API (934) to blockchain network service (940) and from the blockchain service to GIS (942). Also, the requests (transactions) are send, back and forward (944) and available through a Web blockchain UI (936) for better management as monitoring utility.

Data is collected and stored into GIS data store 905, then data is published as web services to GIS Server 909 or 903, and is available through the GIS Enterprise Portal 907. Through the portal and information products users can execute their workflows by using web maps, web apps and analysis tools. Then Web Services Rest 934 requests communicate with the Spatial API connectors (946) through the custom API process (938) for sending (back and forward) the parameters (942) to blockchain Rest API (934), to blockchain network service (940) and from the blockchain service to GIS (942). Also, the requests (transactions) are send, back and forward (944) and available through a Web blockchain UI (936) for better management as monitoring utility.

Figure 10:
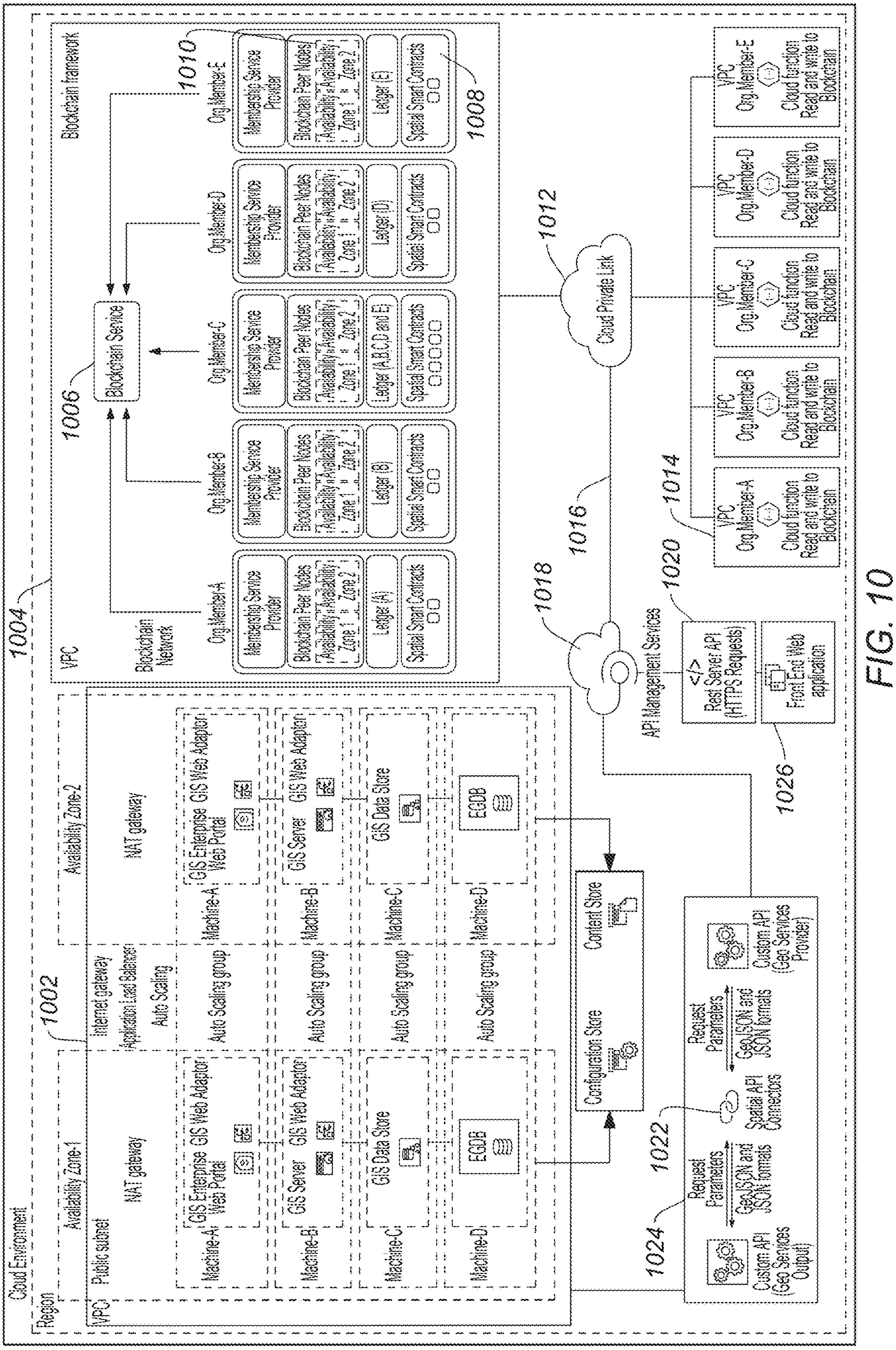
FIG. 10 is a diagram of a GBC framework in a cloud environment, according to embodiments.

FIG. 10 is a diagram of a GBC framework in a cloud environment, according to embodiments. A GIS Platform 1002 implemented on a Virtual Private Cloud (VPN) provides GIS technology components, processes and infrastructure. A blockchain network 1004 is also implemented as a Virtual Private Cloud (VPN) and provides blockchain technology components, processes and infrastructure. A blockchain process service 1006 leverages spatial smart contracts for spatial and non-spatial transactions. Blockchain network 1004 includes multiple organization member computers, as in FIG. 9. Spatial smart contracts 1008 include predefined logic, rules, and roles for GBC participants based on the use case and workflows. Blockchain peer nodes 1010 differs from FIG. 9 in containing two availability zones from GIS Platform 1002.

Cloud private link 1012 connects to multiple Virtual Private Clouds (VPCs) 1014 for the respective members, each with a cloud function for reading and writing to a blockchain. Validation and confirmation between organization members and spatial smart contracts is performed through Cloud Private Link 1012.

Blockchain network 1004 communicates through cloud private link 1012 and API management services server 1018 with a REST (Representational State Transfer) Server 1020. A GIS API process 1024 requests blockchain parameters and processes spatial hash keys to assign to GIS information. REST server 1020 communicates via interface API Management Services server 1018 with GIS API process 1024 for validation, confirmation, and sending authoritative spatial keys to GIS REST spatial connectors 1022. Spatial hash key authentication is created after the validation and confirmation and are communicated through API Management Service 1018. The spatial hash keys are stored into the distributed blockchain ledgers and are available for use into the synchronized GIS System 1002. REST server 1020 communicates with a blockchain front end web application console 1026 to track and monitor authoritative transactions.

Sample Embodiments of System Architectures

Figure 11:
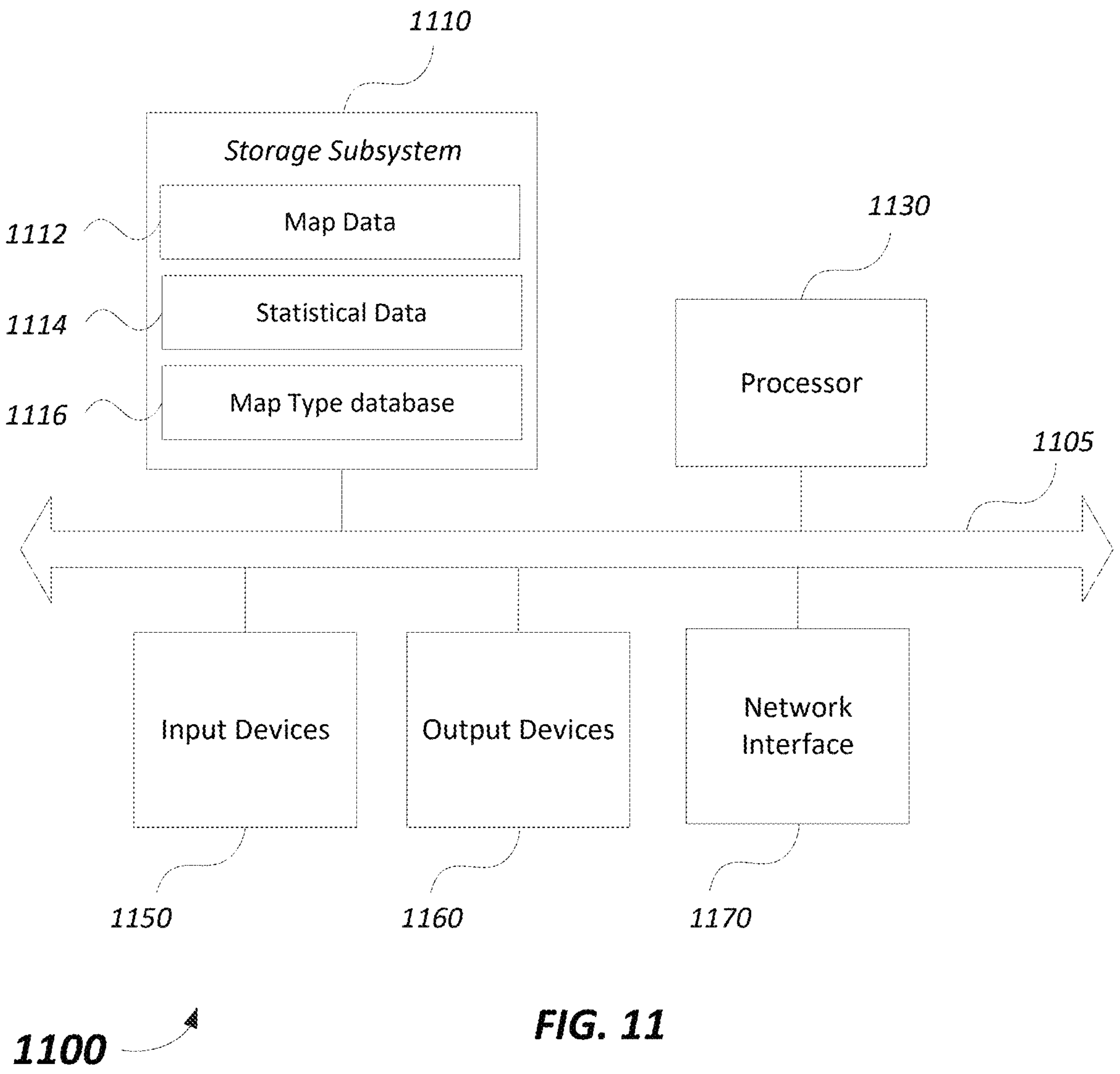
FIG. 11 illustrates a computer system 1100 for implementing a GeoBlockchain, according to certain embodiments of the invention.
Figure 12:
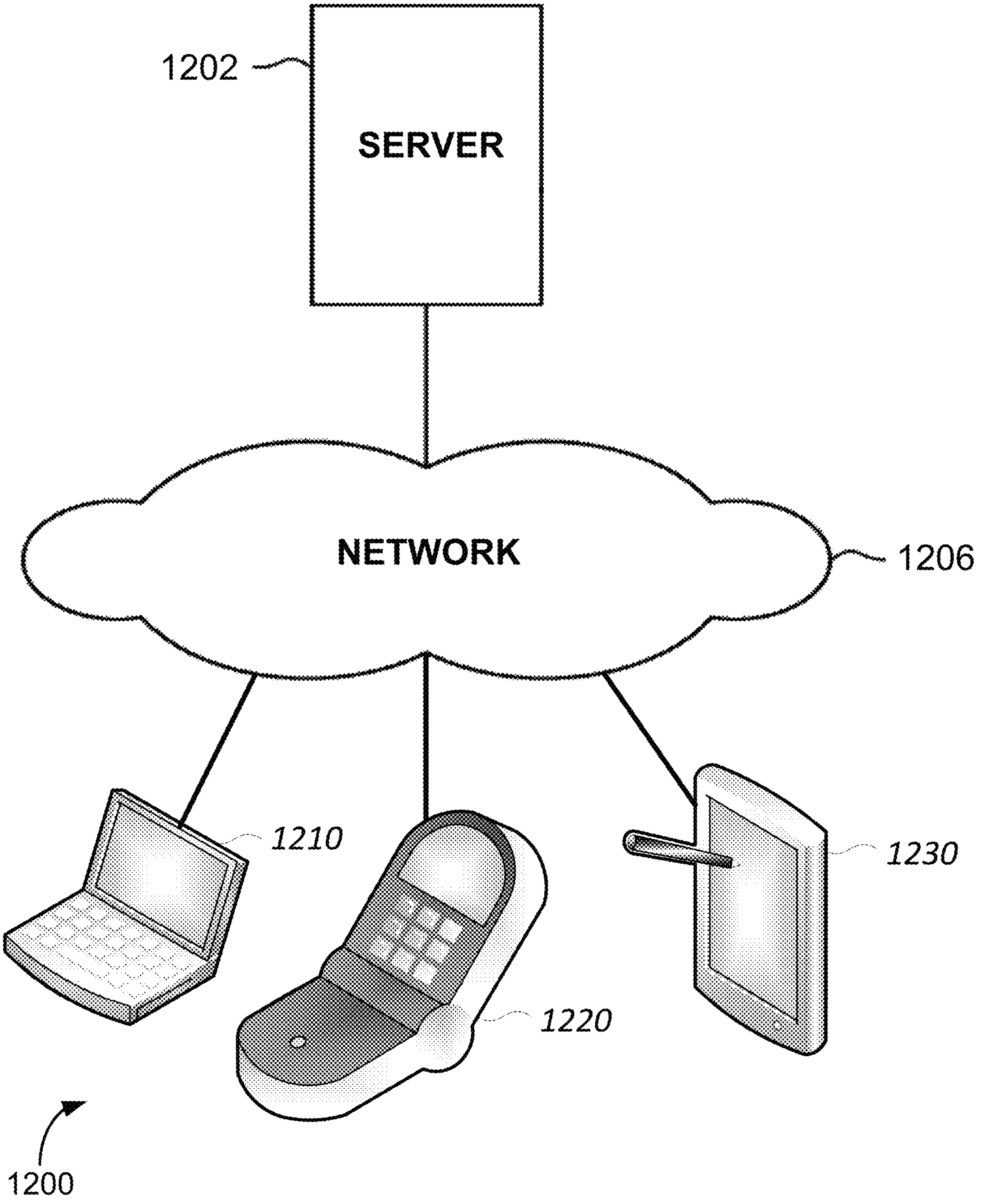
FIG. 12 depicts a simplified diagram of a distributed system for providing a system and method for a GeoBlockchain, according to certain embodiments of the invention.

FIG. 11 illustrates a computer system 1100 for implementing a GeoBlockchain, according to certain embodiments of the invention. The image processing, algorithms, and methods described herein (e.g., FIGS. 1-8) can be implemented with a computer system such as computer system 1100 shown here. Computer system 1100 can be implemented as any of various computing devices, including, e.g., server(s), a desktop or laptop computer, tablet computer, smart phone, personal digital assistant (PDA), or any other type of computing device, not limited to any particular form factor. Computer system 1100 can include processing unit(s) 1130, storage subsystem 1110, input devices 1150 (e.g., keyboards, mice, touchscreens, etc.), output devices 1160 (e.g., displays, speakers, tactile output devices, etc.), network interface 1170 (e.g., RF, 4G, EDGE, WiFi, GPS, Ethernet, etc.), and bus 1105 to communicatively couple the various elements of system 1100 to one another.

Processing unit(s) 1130 can include a single processor, multi-core processor, or multiple processors and may execute instructions in hardware, firmware, or software, such as instructions stored in storage subsystem 1110. The storage subsystem 1110 can include various memory units such as a system memory, a read only memory (ROM), and permanent storage device(s) (e.g., magnetic, solid state, or optical media, flash memory, etc.). The ROM can store static data and instructions required by processing unit(s) 1130 and other modules of the system 1100. The system memory can store some or all of the instructions and data that the processor needs at runtime.

In some embodiments, storage subsystem 1110 can store one or more of data or software programs to be executed or controlled by processing unit(s) 1130, such as map data 1112, statistical data 1114, or map type data 1116, or other suitable database or repository, as may be used in the aforementioned embodiments. As mentioned, "software" can refer to sequences of instructions that, when executed by processing unit(s) 1130, cause computer system 1100 to perform certain operations of the software programs. The instructions can be stored as firmware residing in read only memory and/or applications stored in media storage that can be read into memory for processing by processing unit(s) 1130. Software can be implemented as a single program or a collection of separate programs and can be stored in non-volatile storage and copied in whole or in part to volatile working memory during program execution. From storage subsystem 1110, processing unit(s) 1130 can retrieve program instructions to execute in order to execute various operations (e.g., interpolations) described herein.

It will be appreciated that computer system 1100 is illustrative and that variations and modifications are possible. Computer system 1100 can have other capabilities not specifically described here in detail (e.g., GIS technologies). Further, while computer system 1100 is described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

It should be appreciated that computer system 1100 is illustrative and not intended to limit embodiments of the present disclosure. Many other configurations having more or fewer components than system 1100 are possible.

Aspects of system 1100 may be implemented in many different configurations. In some embodiments, system 1100 may be configured as a distributed system where one or more components of system 1100 are distributed over one or more networks in the cloud.

FIG. 10 depicts a simplified diagram of a distributed system 1200 for providing a system and method for GeoBlockchain, according to an embodiment of the invention. In the embodiment depicted in FIG. 10, system 1200 is provided on a server 1202 that is communicatively coupled with one or more remote client devices 1210, 1220, 1230 via network 1206.

Network 1206 may include one or more communication networks, which could be the Internet, a local area network (LAN), a wide area network (WAN), a wireless or wired network, an Intranet, a private network, a public network, a switched network, or any other suitable communication network or combination thereof. Network 1206 may include many interconnected systems and communication links including but not restricted to hardwire links, optical links, satellite or other wireless communications links, wave propagation links, or any communication protocol. Various communication protocols may be used to facilitate communication of information via network 1206, including but not restricted to TCP/IP, HTTP protocols, extensible markup language (XML), wireless application protocol (WAP), protocols under development by industry standard organizations, vendor-specific protocols, customized protocols, and others as would be appreciated by one of ordinary skill in the art. In the configuration depicted in FIG. 10, aspects of a GeoBlockchain system may be displayed on any of client devices 1210, 1220, 1230.

In the configuration depicted in FIG. 10, system 1100 is remotely located from client devices 1210, 1220, 1230. In some embodiments, server 1202 may perform the methods of determining (or interpolating) a population over a geographic area described herein. In some embodiments, the services provided by server 1202 may be offered as web-based or cloud services or under a Software as a Service (SaaS) model, as would be appreciated by one of ordinary skill in the art.

While the invention has been described with respect to specific embodiments, one of ordinary skill in the art will recognize that numerous modifications are possible. Thus, although the invention has been described with respect to specific embodiments, it will be appreciated that the invention is intended to cover all modifications and equivalents within the scope of the following claims.

The above disclosure provides examples and aspects relating to various embodiments within the scope of claims, appended hereto or later added in accordance with applicable law. However, these examples are not limiting as to how any disclosed aspect may be implemented.

All the features disclosed in this specification (including any accompanying claims, abstract, and drawings) can be replaced by alternative features serving the same, equivalent or similar purpose, unless expressly stated otherwise. Thus, unless expressly stated otherwise, each feature disclosed is one example only of a generic series of equivalent or similar features.

Any element in a claim that does not explicitly state "means for" performing a specified function, or "step for" performing a specific function, is not to be interpreted as a "means" or "step" clause as specified in 35 U.S.C. § 112, sixth paragraph. In particular, the use of "step of" in the claims herein is not intended to invoke the provisions of 35 U.S.C. § 112, sixth paragraph.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a network server, the network server can run any of a variety of server or mid-tier applications, including HTTP servers, FTP servers, CGI servers, data servers, Java servers, and business application servers. The server(s) also may be capable of executing programs or scripts in response to requests from user devices, such as by executing one or more applications that may be implemented as one or more scripts or programs written in any programming language, such as Java®, C, C# or C++, or any scripting language, such as Perl, Python or TCL, JSON, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen or keypad), and at least one output device (e.g., a display device, printer or speaker). Such a system may also include one or more storage devices, such as disk drives, optical storage devices, and solid-state storage devices such as RAM or ROM, as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a non-transitory computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Non-transitory storage media and computer-readable storage media for containing code, or portions of code, can include any appropriate media known or used in the art such as, but not limited to, volatile and non-volatile, removable and non-removable media implemented in any method or technology for storage of information such as computer-readable instructions, data structures, program modules or other data, including RAM, ROM, Electrically Erasable Programmable Read-Only Memory (EEPROM), flash memory or other memory technology, CD-ROM, DVD or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments. However, computer-readable storage media does not include transitory media such as carrier waves or the like.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms “a” and “an” and “the” and similar referents in the context of describing the disclosed embodiments (especially in the context of the following claims) are to be construed to cover both the singular and the plural, unless otherwise indicated herein or clearly contradicted by context. The terms “comprising,” “having,” “including,” and “containing” are to be construed as open-ended terms (i.e., meaning “including, but not limited to,”) unless otherwise noted. The term “connected” is to be construed as partly or wholly contained within, attached to, or joined together, even if there is something intervening. The phrase “based on” should be understood to be open-ended, and not limiting in any way, and is intended to be interpreted or otherwise read as “based at least in part on,” where appropriate. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., “such as”) provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase “at least one of X, Y, or Z,” unless specifically stated otherwise, is otherwise understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present. Additionally, conjunctive language such as the phrase “at least one of X, Y, and Z,” unless specifically stated otherwise, should also be understood to mean X, Y, Z, or any combination thereof, including “X, Y, and/or Z.”

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate, and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method of providing a map with imbedded, authenticated data, the method comprising:

representing a geographic feature on a map at a mapping server;

providing data corresponding to the geographic feature;

receiving an authoritative information product from an authoritative source corresponding to the geographic feature, wherein the authoritative information product from an authoritative source is tagged as coming from the authoritative source with an official digital identifier, wherein the official digital identifier is authenticated using a third-party certificate authority;

accessing a remote blockchain server to provide to the remote blockchain server the authoritative information product and a description of the geographic feature, wherein the accessing is through an application programming interface (API) communicating between a mapping server and a remote blockchain server;

sharing, by the remote blockchain server, the authoritative information product in an electronic file block with multiple blockchain member computers for verification of the official digital identifier;

encoding, by the remote blockchain server, in a first block, the authoritative information product with a location description;

encoding, by the remote blockchain server, in a first block, the authoritative information product with the description of the geographic feature;

combining and encrypting the first block with other blocks of a blockchain that is distributed across a network on multiple computers with each block being validated by the multiple computers;

receiving, at the mapping server, from the remote blockchain server through the API to the mapping server, a link to the blockchain combining the first block with other blocks of the blockchain; and associating the blockchain with the geographic feature in a geoblockchain layer of the map by storing the link to the blockchain in the geoblockchain layer of the map.

2. The method of claim 1 wherein the data represents a transaction.

3. The method of claim 1 wherein the data represents a real estate transaction and the authoritative information product comprises a plurality of a flood plain designation from the Federal Emergency Management Agency (FEMA), a title report from a title company, hazardous waste data, buried fuel or tanks, a license of a title insurance company from a regulator, a zoning map from a city or recorded Covenants, Conditions and Restrictions (CCRs) CCRs from a Homeowners Association (HOA).

4. The method of claim 3 wherein the official digital identifier comprises at least one of an IP address or a website URL authenticated using a third-party certificate authority.

5. The method of claim 1 wherein the data comprises sensor data corresponding to a physical aspect of the geographic feature and a time stamp for the sensor data.

6. The method of claim 1 wherein the geographic feature is a location.

7. The method of claim 1 wherein the geographic feature is a street address.

8. The method of claim 1 wherein the data corresponding to the geographic feature comprises information regarding an aspect of a supply chain shipment.

9. The method of claim 1 wherein the geographic feature is a location and the data corresponding to the geographic feature comprises a compilation of data from authoritative sources concerning the location.

10. A method of providing a map with imbedded, authenticated data, the method comprising:

representing a geographic location on a map with a location description including one or more of points, lines and polygons in a first layer of multiple layers of the map at a mapping server;

receiving a plurality of authoritative information products from a plurality of authoritative sources corresponding to the geographic location, wherein each authoritative information product from an authoritative source is tagged as coming from an authoritative source with an official digital identifier, wherein the official digital identifier is authenticated using a third-party certificate authority;

accessing a remote blockchain server to provide to the remote blockchain server the authoritative information products and a description of the geographic location, wherein the accessing is through an application programming interface (API) communicating between a mapping server and a remote blockchain server;

sharing, by the remote blockchain server, the authoritative information products in separate electronic file blocks with multiple blockchain member computers for verification of the official digital identifier;

encoding, by the remote blockchain server, in separate blocks, each authoritative information product with the description of the geographic location including the one or more of points, lines and polygons from the first layer of the map;

combining and encrypting each block with other blocks of a blockchain that is distributed across a network on multiple computers with each block being validated by the multiple computers;

receiving, at the mapping server, from the remote blockchain server, through the API to the mapping server, separate links to the blockchain for each block with a separate authoritative information product;

associating the blockchain with the geographic location in a geoblockchain layer of the map by storing the separate links to the blockchain in the geoblockchain layer of the map, the geoblockchain layer being separate from thematic layers which may change over time;

storing the map; and providing an interface to the map for remote users, the interface including a different badge representing each authoritative source for the geographic location.

11. The method of claim 10 wherein an information product from an authoritative source comprises a real estate transaction.

12. The method of claim 10 wherein the badge represents an authoritative source and also authenticates that an information product is original, unaltered data.

13. The method of claim 10 wherein the interface includes authoritative information products as packaged compressed files with spatial and non-spatial data, layers and tables.

14. The method of claim 13 wherein the authoritative information products include at least one of a map, application and analysis, and the authoritative information products are represented by different badges.

15. The method of claim 10 wherein an information product comprises data about a physical aspect of the geographic location.

16. The method of claim 10 wherein an information product comprises data about an intangible aspect of the geographic location.

17. The method of claim 10 further comprising multiple information products associated with the geographic location, the multiple information products comprising both data about a physical aspect of the geographic location and data about an intangible aspect of the geographic location.

18. The method of claim 10 further comprising providing a notification of the geographic location being recorded, registered or transferred when the geographic location at least partially overlaps another geographic location previously recorded or registered or mapped.

19. A non-transitory computer-readable storage medium containing instructions which, when executed by a processor, cause the processor to:

represent a geographic feature on a map;

provide data corresponding to the geographic feature;

receive, at a mapping server, an authoritative information product from an authoritative source corresponding to the geographic feature, wherein the authoritative information product from an authoritative source is tagged as coming from the authoritative source with an official digital identifier, wherein the official digital identifier is authenticated using a third-party certificate authority;

access a remote blockchain server to provide to the remote blockchain server the authoritative information product and a description of the geographic feature, wherein the accessing is through an application programming interface (API) communicating between a mapping server and a remote blockchain server;

receive, at the mapping server, from the remote blockchain server, through the API to the mapping server, a link to a blockchain combining a first block with other blocks of the blockchain, wherein the first block was shared with multiple blockchain member computers for verification of the official digital identifier, the authoritative information product with a location description was encoded by the remote blockchain server in a first block, the first block was combined and encrypted with other blocks of a blockchain, the blockchain being distributed across a network on multiple computers with the block being validated by the multiple computers; and associate the blockchain with the geographic feature in a geoblockchain layer of the map by storing the link to the blockchain in the geoblockchain layer of the map.

20. The non-transitory computer-readable storage medium of claim 19 wherein the official digital identifier comprises at least one of an IP address or a website URL.

* * * * *